United States Patent
Lloyd

(10) Patent No.: US 11,423,483 B1
(45) Date of Patent: Aug. 23, 2022

(54) SYSTEM AND METHOD FOR RETIREMENT ACCOUNT CORPORATE STOCK ROLLOVER MAXIMIZATION USING CHARITABLE ENTITIES

(71) Applicant: The Charitable Payraise, LLC, Vienna, VA (US)

(72) Inventor: William R. Lloyd, Vienna, VA (US)

(73) Assignee: The Charitable Payraise, LLC, Vienna, VA (US)

( * ) Notice: Subject to any disclaimer, the term of this patent is extended or adjusted under 35 U.S.C. 154(b) by 0 days.

(21) Appl. No.: 16/998,791

(22) Filed: Aug. 20, 2020

(51) Int. Cl.
  *G06Q 40/00* (2012.01)
  *G06Q 40/06* (2012.01)
  *G06Q 40/04* (2012.01)

(52) U.S. Cl.
  CPC .......... *G06Q 40/06* (2013.01); *G06Q 40/04* (2013.01)

(58) Field of Classification Search
  CPC ......... G06Q 40/00; G06Q 40/04; G06Q 40/06
  See application file for complete search history.

(56) References Cited

U.S. PATENT DOCUMENTS

| | | | |
|---|---|---|---|
| 10,223,749 B2 | 3/2019 | Greenshields et al. | |
| 10,325,320 B2 | 6/2019 | Greene et al. | |
| 10,438,289 B1 | 10/2019 | Gipson et al. | |
| 10,614,530 B2 | 4/2020 | LeBrun | |
| 10,628,887 B2 | 4/2020 | Wadley et al. | |
| 2014/0304193 A1* | 10/2014 | Iskoz | G06Q 40/06 |
| | | | 705/36 R |

FOREIGN PATENT DOCUMENTS

KR   2205456 B1 *  1/2021  ............. G06Q 40/04

OTHER PUBLICATIONS

"The growth of charitable estate planning among Americans nearing retirement," RN James III, MK Lauderdale, CA Robb—Financial Services Review, 2009—academia.edu. (Year: 2009).*

* cited by examiner

*Primary Examiner* — Lalita M Hamilton
(74) *Attorney, Agent, or Firm* — Miles & Stockbridge P.C.; David R. Schaffer

(57) ABSTRACT

Systems and methods of retirement planning for individuals with corporate stock inclusive of a high value to cost basis ratio in their 401K accounts to maximize their retirement income and leave a charitable gift upon their demise greater than the initial value of the corporate stock through the use of a limited liability company (LLC) structure to donate the corporate units to a charity and draw tax free retirement income from the LLC.

25 Claims, 24 Drawing Sheets

The ROQS™ Method

| 601 | 602 | 603 | 604 | 605 |
| SCENARIOS | CLIENTS | ADVISORS | CUSTOMERS | ADMIN |

NEW/EDIT CLIENT

Home > Clients > New Client

New Client — 702

- 711 → Customer: --choose--
- 712 → Advisor: --choose--
- 713 → First: *
- 714 → Middle
- 715 → Last: *
- 716 → Date of Birth (mm/dd/yyyy): *
- 717 → Street *
- 718 → Street 2 *
- 719 → City *
- 720 → State * --choose--
- 721 → Zip *
- 722 → Home Phone:
- 723 → Mobile Phone:
- 724 → Office Phone:
- 725 → Email: *
- 726 → Fax:
- 727 → Notes:
- 728 → Active: * ☐

OK  CANCEL
730  731

FIG. 7b

The ROQS™ Method

701

| 601 | 602 | 603 | 604 | 605 |
|---|---|---|---|---|
| SCENARIOS | CLIENTS | ADVISORS | CUSTOMERS | ADMIN |

NEW/EDIT CLIENT

Home > Clients > Edit Client

Edit Client — 703

| # | Field | Value |
|---|---|---|
| 711 | Customer | Amy Test |
| 712 | Advisor | Doe, John |
| 713 | First: * | Joe |
| 714 | Middle | |
| 715 | Last: * | Dang |
| 716 | Date of Birth (mm/dd/yyyy): * | 01/27/1955 |
| 717 | Street * | 1234 Main |
| 718 | Street 2 * | Suite 200 |
| 719 | City * | Crystal City |
| 720 | State * | Arizona |
| 721 | Zip * | 20180 |
| 722 | Home Phone: | 555-555-1211 |
| 723 | Mobile Phone: | 555-555-1212 |
| 724 | Office Phone: | 555-555-1213 |
| 725 | Email: * | test@test.com |
| 726 | Fax: | |
| 727 | Notes: | test |
| 728 | Active: * | [X] |

OK — 730  CANCEL — 731

FIG. 8

The ROQS™ Method

SCENARIOS 601 | CLIENTS 602 | ADVISORS 603 | CUSTOMERS 604 | ADMIN 605

ADVISORS

Home > Advisors

Customer: -- All -- 810
Active: -- All -- 820
Keyword Filter: Keywords 830 SEARCH 831

835 CREATE ADVISOR

840 Total Records: 6

| Customer 841 | Advisor 842 | Address 843 | Email 844 | Office 845 | Mobile 846 | Active | 847 |
|---|---|---|---|---|---|---|---|
| 850 → Test Customer 2 | Advisor, One | 1234 Main, St 200, Austin, Tx 78738 | test@test.com | (555) 555-1212 | (555) 555-1212 | True | Actions ∨ |
| 851 → Test Customer 2 | Advisor, One | 1234 Main, St 200, Austin, Tx 78738 | test@test.com | (555) 555-1212 | (555) 555-1212 | True | Edit — 862 / Delete — 863 |
| 852 → Test Customer 2 | Advisor, One | 1234 Main, St 200, Austin, Tx 78738 | test@test.com | (555) 555-1212 | (555) 555-1212 | True | Actions ∨ |
| 853 → Test Customer 2 | Advisor, One | 1234 Main, St 200, Austin, Tx 78738 | test@test.com | (555) 555-1212 | (555) 555-1212 | True | Actions ∨ |
| 854 → Test Customer 2 | Advisor, One | 1234 Main, St 200, Austin, Tx 78738 | test@test.com | (555) 555-1212 | (555) 555-1212 | True | Actions ∨ |
| 855 → Test Customer 2 | Advisor, One | 1234 Main, St 200, Austin, Tx 78738 | test@test.com | (555) 555-1212 | (555) 555-1212 | True | Actions ∨ |

Total Records: 6                                           Records to display: 25 ∨

New Advisor —— 902

905 — Customer  --choose--
910 — First: *
915 — Last: *
920 — Street: *
925 — Street 2:
930 — City: *
935 — State: *  --choose--
940 — Zip: *
945 — Mobile Phone: *
950 — Office Phone:
955 — Email:
960 — Fax:
965 — Active: *  ☐

OK  CANCEL
970  971

FIG. 9b

Edit Advisor — 903

| | | |
|---|---|---|
| 905 | Customer: | Test Customer 2 ⌄ |
| 910 | First: * | One |
| 915 | Last: * | Advisor |
| 920 | Street: * | 1234 Main |
| 925 | Street 2: | St 200 |
| 930 | City: * | Austin |
| 935 | State: * | Texas ⌄ |
| 940 | Zip: * | 78733 |
| 945 | Mobile Phone: * | (555) 555-1212 |
| 950 | Office Phone: | (555) 555-1212 |
| 955 | Email: | test@test.com |
| 960 | Fax: | (555) 555-1212 |
| 965 | Active: * | [X] |

901

OK — 970     CANCEL — 971

FIG. 12

The ROQS™ Method

SCENARIOS  CLIENTS  ADVISORS  CUSTOMERS  ADMIN
601  602  603  604  605

SCENARIOS

Home > Scenarios

| | | |
|---|---|---|
| Customer: | -- All -- | 1210 |
| Advisor: | -- All -- | 1220 |
| Client: | -- All -- | 1230 |
| Active: | -- All -- | 1240 |
| Keyword Filter: | Keywords | |

1260  1251  1255
CREATE SCENARIO — 1271

| | Customer | Advisor | Client | Birthday | Notes | Active | |
|---|---|---|---|---|---|---|---|
| | 1261 | 1262 | 1263 | 1264 | 1265 | | |
| 1280 | Amy Test | Doe, John | Dang, Joe | 01/01/01 | Some Notes | True | Actions ⌄ |
| 1281 | Amy Test | Doe, John | Dang, Joe | 01/01/01 | Some Notes | True | View — 1272 |
| 1282 | Amy Test | Doe, John | Dang, Joe | 01/01/01 | Some Notes | True | Edit — 1273 |
| | | | | | | | Delete — 1274 |

Total Records: 3

1200
1269 Total Records: 3

Home > Scenarios > Edit

New Scenario

1301 — VIEW SCENARIO

| Label | Value |
|---|---|
| 1302 Customer: | Amy Test |
| 1303 Advisor: | Doe, John |
| 1304 Client: | Dang, Joe |
| 1305 Retirement State: | Georgia |
| 1306 Pre-Distribution State & Fed Tax Rate: * | 12.00 |
| 1307 Post-Distribution State & Fed Tax Rate: * | 13.00 |
| 1308 Current 401K Total Value: * | 1,234,234 |
| 1309 Company NUA Stock Basis: * | 15 |
| 1310 Company NUA FMV: * | 1,234,234 |
| 1311 Value of Other 401K Funds: * | 12,341,234 |
| 1312 Other Pre-Tax Retirement Assets: * | 150,000 |
| 1313 Company Stock Symbol: * | ACME |
| 1314 Stock Value Discount For Charitable Deduction: * | 20.00 |
| 1315 Date to Sever Assets from Current Retirement Plan: * | 03/13/2025 |
| 1316 Number of years Until Donor Income from Co. Stock: * | 3 (NIMCRUT or CCLC & IRAs) |
| 1317 Growth Rate Prior to Distribution: * | 25.00 |
| 1318 Growth Rate After Distribution: * | 30.00 |
| 1319 Yearly Donor Withdrawal Rate: * | 2.00 |
| 1320 Yearly Charity Distribution Rate: * | 7.00 |
| 1321 Donor Life Expectancy: | 5 |

CLLC Information:

| Label | Value |
|---|---|
| 1322 Incorporation State: * | Alaska |
| 1323 Trust Name: * | ascf |
| 1324 CLLC Loan Interest Rate: * | 6.00   November 2019 AFR (AFR Updated Automatically monthly) |
| 1325 Life Insurance Policy Value: * | 300,000 |
| 1326 Notes: | Some Notes |
| 1327 Active: * | X |

OK 1330  CANCEL 1312

The ROQS™ Method

SCENARIOS  CLIENTS  ADVISORS  CUSTOMERS  ADMIN

EDIT SCENARIO

Home » Scenarios » Edit

1301 — VIEW SCENARIO

Edit Scenario

| Field | Value |
|---|---|
| 1302 — Customer: | Amy Test |
| 1303 — Advisor: | Doe, John |
| 1304 — Client: | Dang, Joe |
| 1305 — Retirement State: | Georgia |
| 1306 — Pre-Distribution State & Fed Tax Rate: * | 12.00 |
| 1307 — Post-Distribution State & Fed Tax Rate: * | 13.00 |
| 1308 — Current 401K Total Value: * | 1,234,234 |
| 1309 — Company NUA Stock Basis: * | 15 |
| 1310 — Company NUA FMV: * | 1,234,234 |
| 1311 — Value of Other 401K Funds: * | 12,341,234 |
| 1312 — Other Pre-Tax Retirement Assets: * | 150,000 |
| 1313 — Company Stock Symbol: * | ACME |
| Stock Value Discount For Charitable Deduction: * | 20.00 |
| Date to Sever Assets from Current Retirement Plan: * | 03/13/2025 |
| Number of years Until Donor Income from Co. Stock: * | 3 (NIMCRUT or CCLC & IRAs) |
| | 25.00 |
| 1317 — Growth Rate Prior to Distribution: * | 28.00 |
| 1318 — Growth Rate After Distribution: * | 30.00 |
| 1319 — Yearly Donor Withdrawal Rate: * | 2.00 |
| 1320 — Yearly Charity Distribution Rate: * | 7.00 |
| 1321 — Donor Life Expectancy: | 5 |

CLLC Information:

| Field | Value |
|---|---|
| 1322 — Incorporation State: * | Alaska |
| 1323 — Trust Name: * | ascf |
| 1324 — CLLC Loan Interest Rate: * | 6.00   November 2019 AFR (AFR Updated Automatically monthly) |
| 1325 — Life Insurance Policy Value: * | 300,000 |
| 1326 — Notes: | Some Notes |
| 1327 — Active: * | [X] |

OK    CANCEL
1330   1312

SYSTEM AND METHOD FOR RETIREMENT ACCOUNT CORPORATE STOCK ROLLOVER MAXIMIZATION USING CHARITABLE ENTITIES

TECHNICAL AREA

Various embodiments of the disclosed subject matter generally relate to financial planning and, more specifically, to systems and methods of retirement planning for individuals with corporate stock inclusive of a high value to cost basis ratio in their 401K accounts to maximize their retirement income and leave a charitable gift upon their demise.

SUMMARY

In accordance with various embodiments of the disclosed subject matter, a computerized method includes: receiving via a network from a computer, retirement financial assets and retirement plan information associated with an individual; and determining from the retirement financial assets and retirement plan information and whether the individual has any publicly traded company stock in at least one qualified retirement plan. If it is determined that the individual has publicly traded company stock in the at least one qualified retirement plan, the computerized method continues by determining, by a processor, retirement financial assets and retirement plan information and how many years until the individual will start withdrawing retirement income from the at least one qualified retirement plan. The computerized method, in response to the individual not starting to withdraw retirement income for over two years and 1 day: continues by receiving a yearly asset value growth rate before taking retirement income, a yearly asset value growth rate after starting taking retirement income, a yearly retirement income withdrawal rate, a yearly charity distribution withdrawal rate, and a life expectancy for the individual; receiving specialized limited liability company (LLC) structure information; receiving a yearly charity distribution amount from the LLC; receiving additional retirement financial and life insurance information; receiving individual and IRA management fee information; and calculating, by the processor, a charitable deduction due to the individual for an amount of donated LLC units and allocating any other retirement assets into a Rollover IRA and a Roth IRA to maximize an amount allocated to the Roth IRA. The computerized method continues by calculating, by the processor, yearly payments to be paid to the individual from the Rollover IRA, the Roth IRA, and yearly loan amounts from the LLC, a total amount the individual will owe to the LLC at term, a yearly amount to be paid to charity, and a total LLC account value at term; calculating, by the processor, an improvement in retirement income over a traditional Rollover IRA; and displaying, on at least one user interface, a calculated yearly and a total income for payments to the individual from the Rollover IRA and the Roth IRA, and the yearly loans from the LLC, the yearly amount to be paid to the charity, a total payments to the charity, a total amount the individual owes on the yearly loans t, the total LLC account value at term, and the improvement in retirement income over a traditional Rollover IRA.

In accordance with various embodiments of the disclosed subject matter, one or more non-transitory computer-readable media for the allocation of retirement account corporate stock rollover assets using charitable entities to maximize retirement income, including: computer instructions for performing a method including receiving via a network from a computer, retirement financial assets and retirement plan information associated with an individual; and determining retirement financial assets and retirement plan information and whether the individual has any publicly traded company stock in at least one qualified retirement plan. If it is determined that the individual has publicly traded company stock in the at least one qualified retirement plan, then, determining, by a processor, retirement financial assets and retirement plan information and how many years until the individual will start withdrawing retirement income from the at least one qualified retirement plan; and, if the individual is not starting to withdraw retirement income for over two years and 1 day: receiving a yearly asset value growth rate before taking retirement income, a yearly asset value growth rate after starting taking retirement income, a yearly retirement income withdrawal rate, a yearly charity distribution withdrawal rate, and a life expectancy for the individual; receiving specialized limited liability company (LLC) structure information; receiving a yearly charity distribution amount from the LLC; receiving additional retirement financial and life insurance information; and receiving individual and IRA management fee information. The method continues by calculating, by the processor, a charitable deduction due to the individual for an amount of donated LLC units and allocating any other retirement assets into a Rollover IRA and a Roth IRA to maximize an amount allocated to the Roth IRA; calculating, by the processor, yearly payments to be paid to the individual from the Rollover IRA and the Roth IRA, yearly loans from the LLC, a total amount the individual will owe to the LLC at term, a yearly amount to be paid to charity, and a total LLC account value at term; calculating, by the processor, an improvement in retirement income over a traditional Rollover IRA; and displaying, on at least one user interface, a calculated yearly and a total income for payments to the individual from the Rollover IRA and the Roth IRA, and the yearly loans from the LLC, the yearly amount to be paid to the charity, a total payments to the charity, a total amount the individual owes on the yearly loans, the total LLC account value at term, and the improvement in retirement income over a traditional Rollover IRA.

In accordance with various embodiments of the disclosed subject matter, a retirement planning platform for maximizing retirement income using charitable entity giving, including: at least one processor; at least one computer-readable storage medium communicatively connected to the at least one processor and having instructions stored thereon which, when executed by the at least one processor, cause the retirement planning platform to: receive via a network from a computer, inputs of retirement financial assets and goal information associated with an individual; and determine from the inputs of retirement financial assets and goal information whether the individual has any publicly traded company stock in at least one qualified retirement plan. If it is determined that the individual has publicly traded company stock in the at least one qualified retirement plan, then: determine, by a processor, retirement financial assets and goal information and how many years until the individual will start withdrawing retirement income from the at least one qualified retirement plan; in response to the individual not starting to withdraw retirement income for over two years and 1 day: receive a yearly asset value growth rate before taking retirement income, a yearly asset value growth rate after starting taking retirement income, a yearly retirement income withdrawal rate, a yearly charity distribution withdrawal rate, and a life expectancy for the individual; receive specialized limited liability company (LLC) structure information; receive a yearly charity distribution amount from the LLC; receive additional retirement financial and life insurance information; and receive individual and IRA management fee information. Then calculate, by the processor, a charitable deduction due to the individual for an amount of donated LLC units and allocating any other retirement assets into a Rollover IRA and a Roth IRA to maximize an amount allocated to the Roth IRA; calculate, by the processor, yearly payments to be paid to the individual from the Rollover IRA and the Roth IRA, yearly loans from the LLC, a total amount the individual will owe to the LLC at term, a yearly amount to be paid to charity, and a total LLC account value at term; calculate, by the processor, an improvement in retirement income over a traditional Rollover IRA; and display, on at least one user interface, a calculated yearly and a total income for the individual from the Rollover IRA and the Roth IRA, the yearly loans from the LLC, the yearly amount to be paid to the charity, a total payments to the charity, a total amount the individual owes on the yearly loans, the total LLC account value at term, and the improvement in retirement income over a traditional Rollover IRA.

BRIEF DESCRIPTION OF THE DRAWINGS

Non-limiting and non-exhaustive embodiments of the present invention are described with reference to the following figures, wherein like reference numerals and/or indicia refer to like parts throughout the various views unless otherwise precisely specified.

FIG. 7a is a new client user interface for adding new client information and is reached from the user interface in FIG. 6, in accordance with various embodiments of the disclosed subject matter.

FIG. 7b is an edit client user interface for editing existing client information reached from the user interface in FIG. 6, in accordance with various embodiments of the disclosed subject matter.

FIG. 8 is an advisor user interface for accessing, editing, and adding advisor information, in accordance with various embodiments of the disclosed subject matter.

FIG. 9a is a new advisor user interface for adding advisor information reached from the user interface in FIG. 8, in accordance with various embodiments of the disclosed subject matter.

FIG. 9b is an edit advisor user interface 901 for editing existing advisor information reached from the user interface 800 in FIG. 8, in accordance with various embodiments of the disclosed subject matter.

FIG. 12 is a scenario user interface for accessing, editing, and adding scenario information, in accordance with various embodiments of the disclosed subject matter.

FIG. 13a is a new scenario user interface for adding new scenario information reached from the user interface in FIG. 12, in accordance with various embodiments of the disclosed subject matter.

FIG. 13b is an edit scenario user interface for editing existing scenario information reached from the scenario user interface in FIG. 12, in accordance with various embodiments of the disclosed subject matter.

FIG. 18 is a view scenario Retirement Optimization of Qualified Stock (ROQS™) Limited Liability Company (RLLC) performance user interface for accessing, editing, and varying existing scenario information, in accordance with various embodiments of the disclosed subject matter. ROQS is a trademark of the Applicant.

FIG. 19 is a view scenario IRA & Roth performance user interface for accessing, editing, and varying existing scenario information, in accordance with various embodiments of the disclosed subject matter.

DETAILED DESCRIPTION

Figure 1:
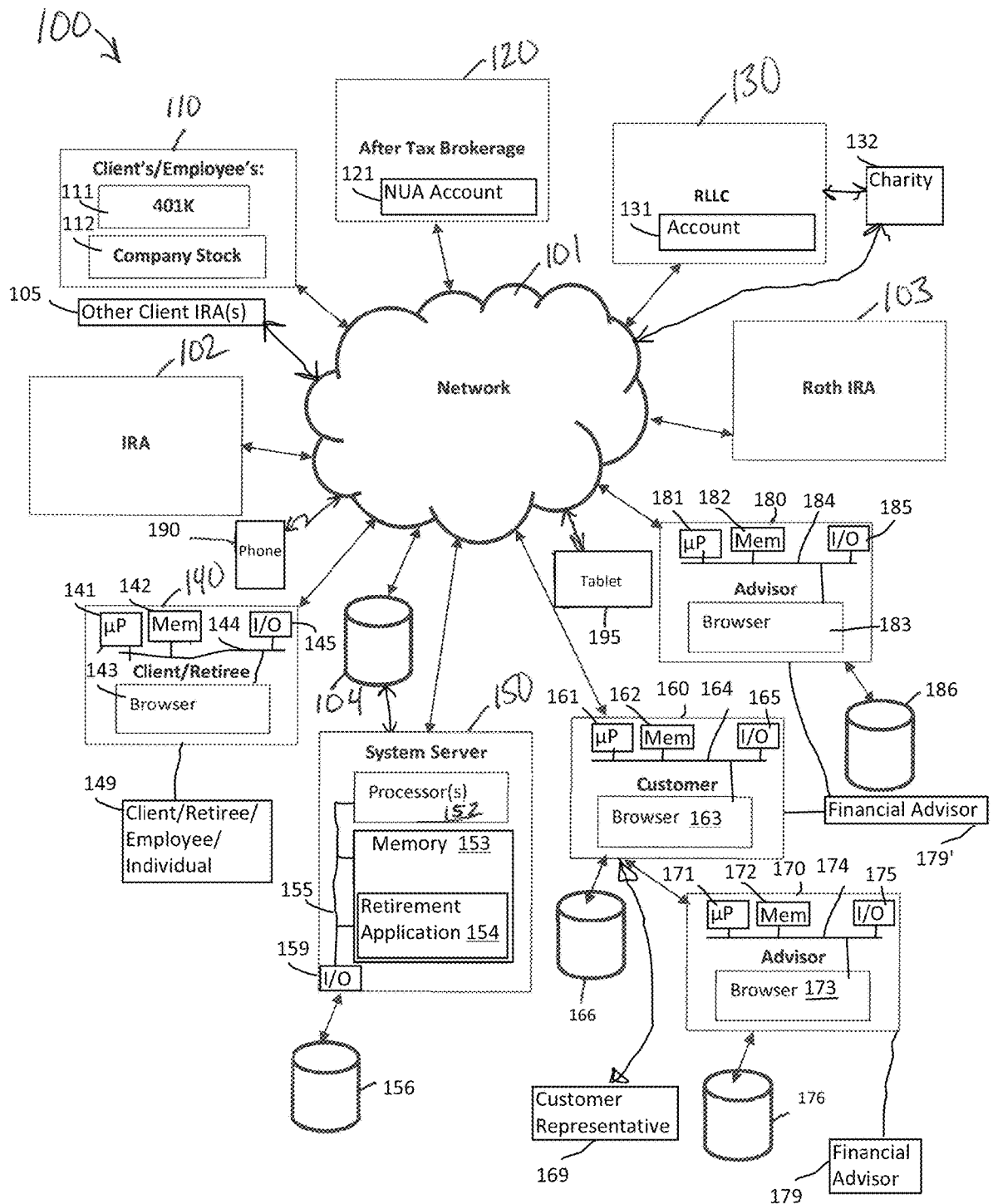
FIG. 1 shows an example network computer and communications operating environment, in accordance with various embodiments of the disclosed subject matter.

In accordance with various embodiments of the disclosed subject matter, a computerized method includes: receiving via a network from a computer, retirement financial assets and retirement plan information associated with an individual; and determining from the retirement financial assets and retirement plan information and whether the individual has any publicly traded company stock in at least one qualified retirement plan. If it is determined that the individual has publicly traded company stock in the at least one qualified retirement plan, the computerized method continues by determining, by a processor, retirement financial assets and retirement plan information and how many years until the individual will start withdrawing retirement income from the at least one qualified retirement plan. The computerized method, in response to the individual not starting to withdraw retirement income for over two years and 1 day: continues by receiving a yearly asset value growth rate before taking retirement income, a yearly asset value growth rate after starting taking retirement income, a yearly retirement income withdrawal rate, a yearly charity distribution withdrawal rate, and a life expectancy for the individual; receiving specialized limited liability company (LLC) structure information; receiving a yearly charity distribution amount from the LLC; receiving additional retirement financial and life insurance information; receiving individual and IRA management fee information; and calculating, by the processor, a charitable deduction due to the individual for the donated LLC units and allocating any other retirement assets into a Rollover IRA and a Roth IRA to maximize an amount allocated to the Roth IRA. The computerized method continues by calculating, by the processor, yearly payments to be paid to the individual from the Rollover IRA, the Roth IRA, and yearly loan amounts from the LLC, a total amount the individual will owe to the LLC at term, a yearly amount to be paid to charity, and a total LLC account value at term; calculating, by the processor, an improvement in retirement income over a traditional Rollover IRA; and displaying, on at least one user interface, a calculated yearly and a total income for payments to the individual from the Rollover IRA and the Roth IRA, and the yearly loans from the LLC, the yearly amount to be paid to the charity, a total payments to the charity, a total amount the individual owes on the yearly loans t, the total LLC account value at term, and the improvement in retirement income over a traditional Rollover IRA.

In accordance with various embodiments of the disclosed subject matter, one or more non-transitory computer-readable media for the allocation of retirement account corporate stock rollover assets using charitable entities to maximize retirement income, including: computer instructions for performing a method including receiving via a network from a computer, retirement financial assets and retirement plan information associated with an individual; and determining retirement financial assets and retirement plan information and whether the individual has any publicly traded company stock in at least one qualified retirement plan. If it is determined that the individual has publicly traded company stock in the at least one qualified retirement plan, then, determining, by a processor, retirement financial assets and retirement plan information and how many years until the individual will start withdrawing retirement income from the at least one qualified retirement plan; and, if the individual is not starting to withdraw retirement income for over two years and 1 day: receiving a yearly asset value growth rate before taking retirement income, a yearly asset value growth rate after starting taking retirement income, a yearly retirement income withdrawal rate, a yearly charity distribution withdrawal rate, and a life expectancy for the individual; receiving specialized limited liability company (LLC) structure information; receiving a yearly charity distribution amount from the LLC; receiving additional retirement financial and life insurance information; and receiving individual and IRA management fee information. The method continues by calculating, by the processor, a charitable deduction due to the individual for an amount of donated LLC units and allocating any other retirement assets into a Rollover IRA and a Roth IRA to maximize an amount allocated to the Roth IRA; calculating, by the processor, yearly payments to be paid to the individual from the Rollover IRA and the Roth IRA, yearly loans from the LLC, a total amount the individual will owe to the LLC at term, a yearly amount to be paid to charity, and a total LLC account value at term; calculating, by the processor, an improvement in retirement income over a traditional Rollover IRA; and displaying, on at least one user interface, a calculated yearly and a total income for payments to the individual from the Rollover IRA and the Roth IRA, and the yearly loans from the LLC, the yearly amount to be paid to the charity, a total payments to the charity, a total amount the individual owes on the yearly loans, the total LLC account value at term, and the improvement in retirement income over a traditional Rollover IRA.

In accordance with various embodiments of the disclosed subject matter, a retirement planning platform for maximizing retirement income using charitable entity giving, including: at least one processor; at least one computer-readable storage medium communicatively connected to the at least one processor and having instructions stored thereon which, when executed by the at least one processor, cause the retirement planning platform to: receive via a network from a computer, retirement financial assets and goal information associated with an individual; and determine from the inputs of retirement financial assets and goal information whether the individual has any publicly traded company stock in at least one qualified retirement plan. If it is determined that the individual has publicly traded company stock in the at least one qualified retirement plan, then: determine, by a processor, retirement financial assets and goal information and how many years until the individual will start withdrawing retirement income from the at least one qualified retirement plan; in response to the individual not starting to withdraw retirement income for over two years and 1 day: receive a yearly asset value growth rate before taking retirement income, a yearly asset value growth rate after starting taking retirement income, a yearly retirement income withdrawal rate, a yearly charity distribution withdrawal rate, and a life expectancy for the individual; receive specialized limited liability company (LLC) structure information; receive a yearly charity distribution amount from the LLC; receive additional retirement financial and life insurance information; and receive individual and IRA management fee information. Then calculate, by the processor, a charitable deduction due to the individual for an amount of donated LLC units and allocating any other retirement assets into a Rollover IRA and a Roth IRA to maximize an amount allocated to the Roth IRA; calculate, by the processor, yearly payments to be paid to the individual from the Rollover IRA and the Roth IRA, yearly loans from the LLC, a total amount the individual will owe to the LLC at term, a yearly amount to be paid to charity, and a total LLC account value at term; calculate, by the processor, an improvement in retirement income over a traditional Rollover IRA; and display, on at least one user interface, a calculated yearly and a total income for the individual from the Rollover IRA and the Roth IRA, the yearly loans from the LLC, the yearly amount to be paid to the charity, a total payments to the charity, a total amount the individual owes on the yearly loans, the total LLC account value at term, and the improvement in retirement income over a traditional Rollover IRA.

People often have long careers with one or more employers that offer stock, stock match, stock bonuses, or sell publicly traded company stock to employees. For employees who work for an employer or multiple employers for significant lengths of time, and especially for senior level employees, the amount of publicly traded company stock that they can accumulate is significant. Moreover, the current stock fair market value (FMV) can be significantly greater than the cost basis of the stock, for example, a FMV of $1,000,000.00 versus a cost basis of $400,000.00. This can result in significant tax burdens after the employee sells the stock, puts the proceeds into a rollover retirement account, for example, a rollover IRA, and then starts withdrawing the proceeds from his/her rollover retirement account and paying ordinary income tax rates on the withdrawals. In addition, some of these employees have amassed significant non-company stock retirement assets to fund their retirement and want to be able to use all of their retirement assets wisely over their lifetimes and during retirement, yet still be able to make a significant charitable donation when they die. Unfortunately, current financial planning tools are not able to discern how to determine the best retirement plan. That is, current tools do not assist users with determining when to retire, how to transfer their company stock from their retirement account to reduce tax liabilities, determine a payout schedule from the individual's retirement assets, permit adjustment of factors to maximize retirement incomes, create a charitable donation from previously qualified assets, and other important planning decisions. In addition, current retirement planning tools are not integrated with other tools to provide assistance to the individual in planning his/her retirement, forecast after tax income, as well as the benefits and amounts of charitable donations.

The methods and systems of the presently disclosed subject matter disclosed herein assist users in making the above-described determinations when an individual is getting ready to retire, for example, someone who has worked for many years for one or more companies with publicly traded stock and has accumulated an amount of the publicly traded company stock, through either purchases, match, or grants, in their company retirement account(s), e.g., but not limited to, 401k(s), Employee Stock Option Program (ESOP), or Profit Sharing. As a result, when company stock is distributed out of the individual's retirement account, ordinary income taxes will need to be paid on the basis, and capital gains taxes paid on the net unrealized appreciation (NUA). NUA is the difference between the individual's company stock's basis and market value of the company stock. In general, when this NUA stock is distributed out of the individual's retirement account(s), the individual is taxed on the entire NUA stock value at ordinary income rates. In the various embodiments of the methods and systems of the presently disclosed subject matter, taxation can be reduced by up to 99%.

A user of the methods and systems can be the individual (i.e., a client), as well as, the individual's financial advisors, accountants, estate attorneys, charities, brokerage houses, etc. In addition, the individual usually has other traditional retirement assets in their account(s), cash, other non employer stocks and mutual funds, which may or may not be adequate to provide sufficient income for the individual's planned retirement. The methods and systems can determine how the individual can ultimately leave the value of the company stock to a charity while gaining a significant and legal tax reduction, yet still being able to derive retirement income from the company stock during the individual's retirement years, and reduce taxation on the other pretax retirement assets. In fact, in general, the ultimate capital gift to the charity is significantly larger than the original value of the NUA stock when used to capitalize the LLC. The methods and systems can also determine, based on the individual's retirement date; when the individual should start receiving retirement income from the value of their company stock; how to allocate the individual's retirement assets to minimize the tax burdens, maximize their yearly retirement income; provide yearly charitable contributions; and still leave a significant capital gift to the designated charity(ies) when the individual dies.

The methods and systems of the presently disclosed subject matter permit the user to set retirement goals and plan for the individual's retirement. Specifically, the user can select a retirement date, select when retirement assets will begin to be distributed to the individual, determine the individual's estimated yearly distributions, the amount of a yearly charitable contribution (1% or greater) to the charity owner, how to allocate the individuals retirement assets and credits between IRA, Roth IRA, and a non-profit owned limited liability company (hereinafter referred to as a "ROQS™ LLC" or a "RLLC") that will be set up by the individual (i.e., Donor), as well as other factors. ROQS™ is a trademark of the applicant. The method and system also estimates yearly, after-tax distributions to the individual from the IRA, Roth IRA, and loans from the RLLC to the individual, as well as a yearly payment amount to the charity owner from the RLLC.

The RLLC, is structured and separately set up to receive the NUA stock after the individual initially transfers the NUA stock out of his/her retirement account and into an after tax brokerage account. This is permitted under the tax laws (IRC § 402(e)(4)) and reduces tax liability by imposing ordinary income tax on the basis, and capital gains tax on the gain (as opposed to ordinary income tax on the entire sum as in a Rollover IRA in the traditional method on the NUA stock. Recent changes in the U.S. tax laws in 2019 removed a one-year waiting period that previously existed before an individual could liquidate the NUA stock from the after tax brokerage account. As a result of the tax law changes, an individual can now receive immediate capital gains tax treatment on the gain in the NUA stock if sold after transfer to the after tax brokerage account. Various embodiments of the methods and systems can provide yearly "what-if" estimates by varying the inputs and assumptions to permit the user to fine tune how best to distribute the individual's assets, establish the RLLC, determine the most beneficial yearly retirement asset distribution plan, prevent one or more yearly distributions if doing so would decrease the capital value of the RLLC below a predetermined minimum level, provide a comparison of each plan against a standard retirement distribution plan where all assets are taxed at ordinary income rates, show the increase in after tax retirement income based on using the methods and systems of the presently disclosed subject matter over the standard method, and determine what the individual's estate needs to repay to the RLLC and which assets can be used to pay off the loan and accrued interest. Still other embodiments of the methods and systems can provide Monte Carlo simulations to produce alternative scenarios that show the probability of successful lifetime withdrawals at various distribution rates and portfolio returns, and display the results in both table and graphic forms for comparison. The Monte Carlo simulation scenarios can be displayed together with the current scenario plan with comparison information showing increases or decreases from the current scenario. If desired, some or all of the simulation results can be saved in the individual's account as alternative scenarios as well as, if one scenario simulation result is preferred, it can be saved as the current scenario. In general, the individual's RLLC investment values will be pulled nightly from the RLLC brokerage account and other retirement accounts and will automatically update the ROQS™ system and method.

Based on the individual's retirement needs, the system can calculate separate yearly "distributions" from the RLLC to a charity-owner (i.e., Donee), which owns 99% of the RLLC, is the ultimate beneficiary, and can also produce a yearly distribution to the individual in the form of a loan, which the individual, or more accurately, the individual's estate, will need to repay with interest at the end of the RLLC, i.e., at the time of the individual's (or spouse's) death. If in any given year the "distribution" to the individual or the charity would reduce the capital value of the RLLC to below a predetermined minimum amount, no payments will be made from the RLLC to either the charity or the individual. For example, if the method and system calculates that one or both of the scheduled yearly distributions would reduce the capital value of the RLLC to below the required minimum value, for example, but not limited to, 10% of the initial capital. The user may be provided with a table outlining the yearly payments and one or more charts showing the growth of the user's total net retirement compared to a traditional straight Rollover IRA retirement plan. Depending on the initial inputs including, for example, but not limited to, number of years to retirement, amount of any NUA stock, etc., the user may be directed to a different "what-if" method and system to calculate yearly retirement distributions for the individual. In general, these different "what-if" methods and systems implement a Charitable Remainder Unitrust (CRUT) retirement plan, a Charitable Remainder Annuity Trust (CRAT) retirement plan, or a Net Income with Makeup Charitable Remainder Unitrust (NIM-CRUT) or RLLC within the retirement plan based on when income is required.

The various embodiments of the disclosed subject matter describe financial planning for retirement can provide at least one of the following technological improvements: 1) improved planning for when to retire, maximizing retirement income, minimizing taxes and distribution decisions; 2) improved after tax retirement income; RLLC; 3) improved planning on how to schedule yearly payouts from several retirement accounts based on multiple retirement goals RLLC; and 4) improved processes for determining yearly RLLC charitable donations while still maintaining a RLLC capital value above a predetermined, required minimum level.

In the following description, for the purposes of explanation, numerous specific details are set forth in order to provide a thorough understanding of embodiments of the presently disclosed subject matter. Of course, one skilled in the art will recognize that embodiments of the presently disclosed subject matter can be practiced with some or all of these specific details. For example, while the disclosure specifically describes starting with a single account with NUA stock from a single company, embodiments of the presently disclosed subject matter apply equally to multiple accounts with NUA stock from multiple different companies.

Moreover, the techniques introduced here can be embodied as special-purpose hardware (e.g., circuitry), as programmable circuitry programmed with software and/or firmware, or as a combination of special-purpose and programmable circuitry. In addition, embodiments of the presently disclosed subject matter can include a machine-readable medium having stored thereon machine-executable instructions that, when executed, program a computer (or other electronic device) with at least one processor to perform a process. The machine-readable medium can include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

As used herein, the terms "employee," "client," "individual," and "retiree" refer to a natural person, i.e., not a company or business entity, who is approaching retirement and for whom various embodiments of the disclosed subject matter are performed.

FIG. 1 shows an example network computer and communications operating environment 100, in accordance with various embodiments of the disclosed subject matter. In FIG. 1, the network computer and communications operating environment 100 includes a communications network (hereinafter "the network") 101, which can include, for example, but is not limited to, an encrypted or unencrypted wired or wireless network (for example, but not limited to a local area network (LAN), wide area network (WAN), metropolitan area network (MAN), etc.) and is communicatively connected to and communicatively connects a variety of network resources using a variety of communication protocols and/or technologies. For example, the network 101 is connected to and in communication with at least one individual's Rollover individual retirement account (IRA) 102, at least one individual's Roth individual retirement account (Roth IRA) 103, and a network data storage system 104, which can include any of the above-discussed storage devices, and one or more other client IRA(s) 105, which the individual may already have in place. In addition, the network 101 is connected to and in communication with at least one individual's company retirement account 110, which can reside with and be managed by one or more non-company brokerage firms 110. The individual's company retirement account 110 can include, but is not limited to, a 401K 111 and a company stock program 112. The network 101 is further connected to and in communication with at least one after tax brokerage 102, which enables an employee to roll over the company stock 112 into an account set up for the employee, upon the employee's retirement, and avoid immediately having to pay taxes on the present value of the company stock that is rolled over from the employee's retirement account 110. For example, in various embodiments of the disclosed subject, the after tax brokerage 120 has at least one net unrealized appreciation (NUA) account 121 into which the company stock is rolled over from the employee's retirement account 110. The value of the company stock 112 transferred into the NUA account 121 based on market value is recorded for tax purposes. Once done, a charitable deduction can be calculated by subtracting the cost basis of the company stock 112 from the market value. If any charitable deduction remains it can be used to offset an equal sum for a Roth IRA 103 conversion, resulting in no tax on the sum allocated into the Roth IRA 103. Distributions from the Roth IRA 103 during retirement are tax-free.

In FIG. 1, the Roth IRA 103 is connected to and in communication with the network 101 and the other elements connected to the network 101. The network 101 is still further connected to and in communication with at least one RLLC 130 to permit communication between the at least one RLLC 130 and at least one after tax brokerage 102, which enables the employee to transfer the company stock 112 from the NUA account 121 into an account 131 owned by the RLLC 130 a number of RLLC units. At this juncture 99% of the RLLC units are donated to a charity 132, which can be connected and in communication with the RLLC 130 and the account 131, either directly or via the network 101. Once in the RLLC account 131, the company stock can be sold and other assets purchased with the proceeds of the sale. The new securities will be purchased in accordance with the terms of a RLLC Investment Policy Statement (IPS) in account 131. In embodiments of the presently disclosed subject matter, in general, the charity 132 has the power to approve or disapprove the IPS. Non-company stock assets in the 401K account 111 can be transferred to the employee's Rollover IRA 102 tax-free. However, unlike the Roth IRA 103, any funds withdrawn from the Rollover IRA 102 by the employee will be taxed as ordinary income.

In FIG. 1, the network 101 is still further connected to and in communication with at least one client computer system 140, which can include a microprocessor 141, an internal memory 142 (e.g., but not limited to, flash memory, Random Access Memory (RAM), etc.), and an internal communication system 144 connecting and enabling communication between the microprocessor 141, the internal memory 142, a browser 143, and an input/output (I/O) system 145 are connected to and in communication with the network 101. A client/retiree/employee/individual 149 is connected to and controls the at least one client computer system 140. The network 101 is also connected to and in communication with a system server 150, which is shown in FIG. 1 connected to a cloud, i.e., the network 101, as a resource. The system server 150 can include one or more processors 152, for example, but not limited to, one or more microprocessors 152, which are connected to and in communication with an internal memory 153 via a system server internal communication system 155, which is connected to and in communication with a system server I/O system 159 that is connected to and in communication with a dedicated external system server data storage device 156, the network 101, and the data storage system 104. The network data storage system 104 can be a secure storage system that, along with system server data storage device 156, is used to securely store client-specific retirement financial information that is used by various embodiments of the disclosed subject matter. An executable copy of a retirement planning application 154 is shown occupying a portion of the system server internal memory 153 and ready for execution. The retirement planning application 154 can be stored in the dedicated external system server data storage device 156 before it is loaded into the system server memory 153 to be executed. In various embodiments of the disclosed subject matter, the retirement planning application 154 can be stored in and the system server 150 can communicate with the data storage device 104 either through the client system internal communication system 155 via the network 101 or directly with the network data storage device 104. In the various embodiments of the disclosed subject matter, the retirement planning application 154 can be provided as a non-downloadable software as a service (SaaS) application and downloadable application from a data storage device, for example, but not limited to, the network data storage device 104 and the system server data storage device 156, a program on a CD, DVD, flash drive, etc.

In FIG. 1, the network 101 is still further connected to and in communication with at least one customer computer system 160, which can include a customer system microprocessor 161, a customer system internal memory 162 (e.g., but not limited to, flash memory, Random Access Memory (RAM), etc.), and a customer system internal communication system 164 connected to and enabling communication between the microprocessor 161, the customer system internal memory 162, a customer system browser 163, and a customer system input/output (I/O) system 165 that is connected to and in communication with a dedicated external customer system data storage device 166 (for example, but not limited to, a Microsoft® Acer system, the network 101, and a first advisor computer system 170. The at least one customer computer system 160 can also be directly connected to and in communication with at least one customer financial advisor 179'. At least one customer representative 169 is connected to and controls the at least one customer computer system 160. The at least one customer computer system 160 is further connected to and in communication with at least one advisor computer system 170, which can include an advisor system microprocessor 171, an advisor system internal memory 172 (e.g., but not limited to, flash memory, Random Access Memory (RAM), etc.), and an advisor system internal communication system 174 connected to and enabling communication between the advisor system microprocessor 171, the advisor system internal memory 172, an advisor system browser 173, and an advisor system input/output (I/O) system 175 that is connected to and in communication with a dedicated external advisor system data storage device 176 and the first customer computer system 160. At least one independent financial advisor 179 can be connected directly to and control the at least one customer computer system 160.

In FIG. 1, the network 101 is still further directly connected to and in communication with at least one independent advisor computer system 180, which can include an independent advisor system microprocessor 181, an independent advisor system internal memory 182 (e.g., but not limited to, flash memory, Random Access Memory (RAM), etc.), and an independent advisor system internal communication system 184 connecting and enabling communication between the independent advisor system microprocessor 181, the independent advisor system internal memory 182, an independent advisor system browser 183, and an independent advisor system input/output (I/O) system 185 that is connected to and in communication with a dedicated external advisor system data storage device 186. The least one independent financial advisor 179' can be connected to and control the at least one advisor computer system 180.

In addition, in FIG. 1, the network 101 and the resources attached to it can be accessed by a user using a mobile/smart phone 190, a tablet 195, or other device with communications capability using a secure communications device and/or secure communications connection applications.

Figure 2:
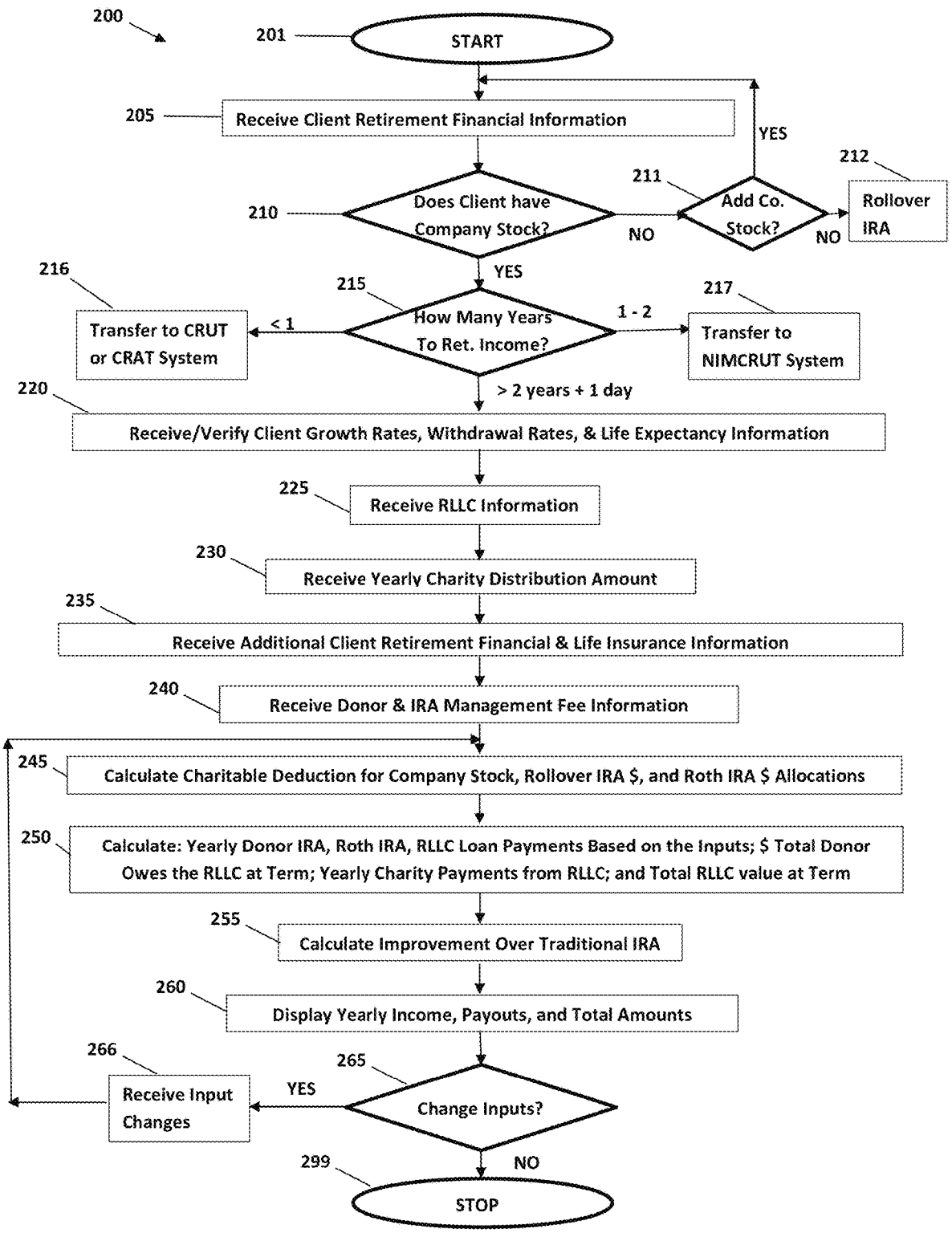
FIG. 2 is a flow chart that shows sets of operations for planning for retirement using a charitable entity, in accordance with various embodiments of the disclosed subject matter.

FIG. 2 is a flow chart that shows sets of operations 200 for planning for retirement using a charitable entity or LLC, in accordance with various embodiments of the disclosed subject matter. In some embodiments of the disclosed subject matter, the sets of operations 200 in FIG. 2 can be implemented in a process, a method, and/or a system where all of the operations are performed, as well as, in some other embodiments, less than all of the operations are performed. Also, the operations can be performed in sequence, in different orders, or in parallel, in some embodiments of the disclosed subject matter. Further, the operations can be performed by the components of the computer network and communications system 100 of FIG. 1 including, for example, but not limited to, the system server 150. Still further, the operations can be performed by the components of the retirement planning system 100 of FIG. 5 and the computer network and communications system 100 of FIG. 1.

In FIG. 2, a start operation 201 initiates execution of the sets of operations 200 and a receive client retirement financial information operation 205 receives client retirement financial information, which information can be received from a user using a device over a communications network, for example, but not limited to, the device being one at least one of the one or more client computer system 140, at least one customer computer system 160, one or more of the at least one advisor computer system 170, one or more of the individual advisor system 180, and the communications network being the network 101. In various embodiments of the presently disclosed subject matter, the user can be a client (also referred to as an individual), charity, attorney, accountant, an independent advisor to the client, a customer (e.g., but not limited to, a brokerage or financial advisory firm), or from an advisor working for the customer. The client retirement financial information can include, for example, but not limited to, details on what are the client's retirement assets in the client's company and other retirement accounts. The client can also be referred to as a donor in relation to a donation of the RLLC units to one or more charities. For example, this client retirement financial information can include, but is not limited to: client's name, date of birth, resident state, and planned retirement state; what is the value of the cash and non-company stock securities are in the client's 401K account 111; how much company stock the client owns; the value of the company stock owned by the client; the stock symbol; a number of NUA shares owned; the current stock price, which can be in the client's 401K account 111 or in a separate company stock account 112 (e.g., but not limited to, an ESOP) or both; the cost basis for the company shares owned (i.e., how much did the client pay for the stock); inclusion of multiple client 401K accounts with or without another company's stock and, if yes, how many shares of each other company's stock are owned, the value of the other shares owned, the cost basis for the other shares owned; the date to sever all retirement assets from their current retirement plan(s); how long until the client will retire; and other basic personal information such as, but not limited to, a number of years until the client will take money from their IRA, Roth IRA, and the RLLC (this must be a minimum value of 2 years plus 1 day); an expected life span of the client after retirement (a minimum of 10 years and a maximum of 30 years are assumed, but can be varied); an assumed RLLC unit discount percentage (in general, this is in the range of 15%-20%, but is not finally determined until an independent third party appraisal to determine the value of the RLLC units is obtained); a combined federal and state pre-distribution tax rate for the client; and a combined federal and state post-distribution tax rate for the client (the pre- and post-distribution tax rates can range from 20% to 50%, depending on the individual client and in which state the client lives).

In FIG. 2, a client stock decision operation 210 determines from the received client retirement financial information whether there is company stock in any of the client's 401Ks and, if not, client stock decision operation 210 branches to re-input decision operation 211, which determines whether the user wants to change the received client retirement financial information to include company stock information. If a NO is received, then re-input decision operation 211 branches to a transfer to a Rollover IRA operation 212. If the user says YES, then re-input decision operation 211 branches to the receive client retirement financial information operation 205 to obtain the new inputs regarding the company stock. If the client stock decision operation 210 determines, YES there is company stock in the client's 401K, then a how many years to receive retirement income decision operation 215 determines how many years before the client wants to start receiving income. If the how many years to receive retirement income decision operation 215 determines that the client wants to receive income in less than 1 year after retirement, then the receive retirement income decision operation 215 branches to transfer to a CRUT or a CRAT system operation 216 to calculate the client's retirement planning options using a CRUT or a CRAT planning system. If the how many years to receive retirement income decision operation 215 determines that the client wants to receive income between 1 and 2 years after retirement, then the receive retirement income decision operation 215 branches to transfer to a NIMCRUT system operation 217 to calculate the client's retirement planning options using a NIMCRUT. If the how many years to receive retirement income decision operation 215 determines that the client wants to receive income more than 2 years and 1 day after retirement, the receive retirement income decision operation 215 branches to a receive/verify client asset growth and withdrawal rates and life expectancy information operation 220. The receive client asset growth and withdrawal rates and life expectancy information operation 220 receives and verifies: a yearly growth rate for the retirement assets up until the client begins taking distributions (in general, this yearly growth rate ranges from 1%-7%); and a yearly withdrawal rate from the retirement assets up after the client begins taking distributions; a client's life expectancy information; a yearly withdrawal rate from the IRA (taxable) and/or Roth IRA (non-taxable) account(s) once the client starts taking distributions; and a yearly withdrawal rate from the RLLC, which is actually structured and taken as loan withdrawals that must be repaid to the RLLC at the time of the client's death from the client's estate assets. In general, the loan withdrawals can be between 1%-10% of the then-existing capital value of the RLLC. It should be noted, that, in the presently described embodiment, at no time will the system permit the capital value of the RLLC investment account 131 to be reduced to less than 10% of the original value by a loan withdrawal by the client or a yearly payment to the charity. For example, if the RLLC investment account 131 starts out with an original capital value of $1,000,000.00, then at no time can the capital value of the RLLC investment account 131 ever go below $100,000.00 due to withdrawals. If any scheduled yearly withdrawals to the charity and client will reduce the capital balance in the RLLC investment account 131 to below this 10% of the original capital value, the yearly withdrawals will be suspended until the withdrawals will not result in a minimum capital balance of less than 10% of the original capital value. However, if the balance will only go below the minimum balance because of the loan withdrawal by the client, then only the client's loan withdrawal will be suspended until taking the client's loan withdrawal will not result in a minimum capital balance of less than 10% of the original capital value.

In FIG. 2, after the receive client asset growth and withdrawal rates and life expectancy information operation 220, a receive RLLC information operation 225 receives information used to set up a RLLC, i.e., a limited liability company, including, for example, but not limited to, a state of incorporation for the RLLC, a term for the RLLC, a name for the RLLC, how initial RLLC creation fees will be paid, a name(s) of a manager(s) of the RLLC, amounts for the initial RLLC creation fees, an amount for annual accounting fees for the RLLC; and a yearly average loan interest rate (which, at a minimum, is the most recently published Long-term Applicable Federal Rate (AFR), or 110% AFR, or 120% AFR, or 130% AFR). After the RLLC information is received, the RLLC 130 is created, and the RLLC investment account 131 is established for the RLLC 130, the company stock can be transferred from the NUA stock account 121 in the after-tax brokerage 120 to the RLLC investment account 131 in the RLLC 130. A receive yearly charity distribution operation 230 receives an assumed yearly distribution percentage of the capital value of the RLLC investment account 131 to go to the charity (for example, but not limited to, 1%-7%). A receive additional client retirement financial information operation 235 receives additional client retirement financial information that can be used as assets to be pledged to guarantee repayment of the loan money owed to the RLLC investment account 131 by the client's estate (these assets can include, but are not limited to, cash, other securities, life insurance, real estate, etc.). A receive donor and IRA management fee information operation 240 receives a yearly client (or donor) RLLC management fee cost and a yearly IRA management fee cost, for example, but not limited to, a fixed or average dollar amount or percentage of the RLLC investment account 131 value for the yearly client (or donor) RLLC management fee cost, and, likewise, for example, but not limited to, a dollar amount or percentage of the IRA value for the yearly IRA and Roth IRA management fee costs. The receive yearly charity distribution operation 230, the receive additional client retirement financial information operation 235, and the receive donor and IRA management fee information operation 240 can receive their respective information in the order presented, in parallel, in random order, or in reverse order.

In FIG. 2, after the receive donor and IRA management fee information operation 240, a calculate a charitable deduction and Rollover IRA and Roth IRA allocations operation 245 calculates a charitable deduction amount based on the value/valuation of the donated company stock less the RLLC unit discount percentage, and a remaining charitable deduction amount by subtracting the cost basis of the company stock from the charitable deduction amount and allocating an amount of the non-company stock 401K assets equal to the remaining charitable deduction amount into a Roth IRA. The remainder of the non-company stock 401K assets remain in a Rollover IRA. The higher the remaining charitable deduction amount that is allocated into the Roth IRA the better for the client, because money in a Roth IRA is withdrawn tax free, unlike regular Rollover IRA withdrawals which are taxed as ordinary income. Based on the calculate operation 245 results and initial inputs, a calculate yearly payments and interest earned operation 250 calculates yearly donor IRA, Roth IRA, and RLLC loan withdrawals to the client; yearly total loan amount that the donor owes to the RLLC at Term, i.e., when the RLLC is ended after the individual's death; yearly charity payment amounts from RLLC; and total RLLC value at the planned end of the RLLC, i.e., the term of the RLLC at the end of the client's life. A calculate improvement over traditional IRA operation 255 calculates amounts of improvement in yearly and total retirement funds that are made available to the client when compared to a straight rollover IRA where the value of the client's retirement assets are rolled-over into the Rollover IRA after liquidation (as cash), including the company stock value. A display yearly income, payouts, and total amounts operation 260 displays graphs and tables on one or more user interfaces, which can show comparison graphs of the performance of the traditional IRA to various embodiments of the disclosed subject matter, the yearly payouts (i.e., distributions) to the client and the charity, loan and interest balances, and growth in each of the Rollover IRA, Roth IRA, and RLLC accounts, as well as yearly comparisons of the performances of a traditional 100% Rollover IRA account, or Rollover IRA withdrawal charitable distribution versus the combined performances of the Rollover IRA, Roth IRA, and RLLC accounts in various embodiments of the presently disclosed subject matter. At least one toggle button is implemented on the user interfaces to enable the user to alternate comparisons between the new method income and the Rollover IRA, both with and without charitable distributions. Examples of the graph and table user interfaces are seen in FIGS. 16-21 and described herein in relation thereto.

In FIG. 2, a change inputs decision operation 265 determines whether the user wants to change, i.e., vary at least one of the input values to perform "what-if" calculations of alternative strategies and, if it is determined that YES, the user wants to vary at least one of the input values, a receive input changes operation 266 receives the changed input values, which can be one or all of the prior received inputs, and branches back to the calculate a charitable deduction and Rollover IRA and Roth IRA allocations operation 245 to again perform operations 245, 250, and 255 to re-calculate all of the values therein and then to display operation 260 to display the re-calculated graphic and tabular results from operations 245, 250, and 255 on the user interface. If it is determined that NO, the user does not want to vary at least one of the input values, a stop operation 299 ends the performance of the sets of operations 200.

Figure 3:
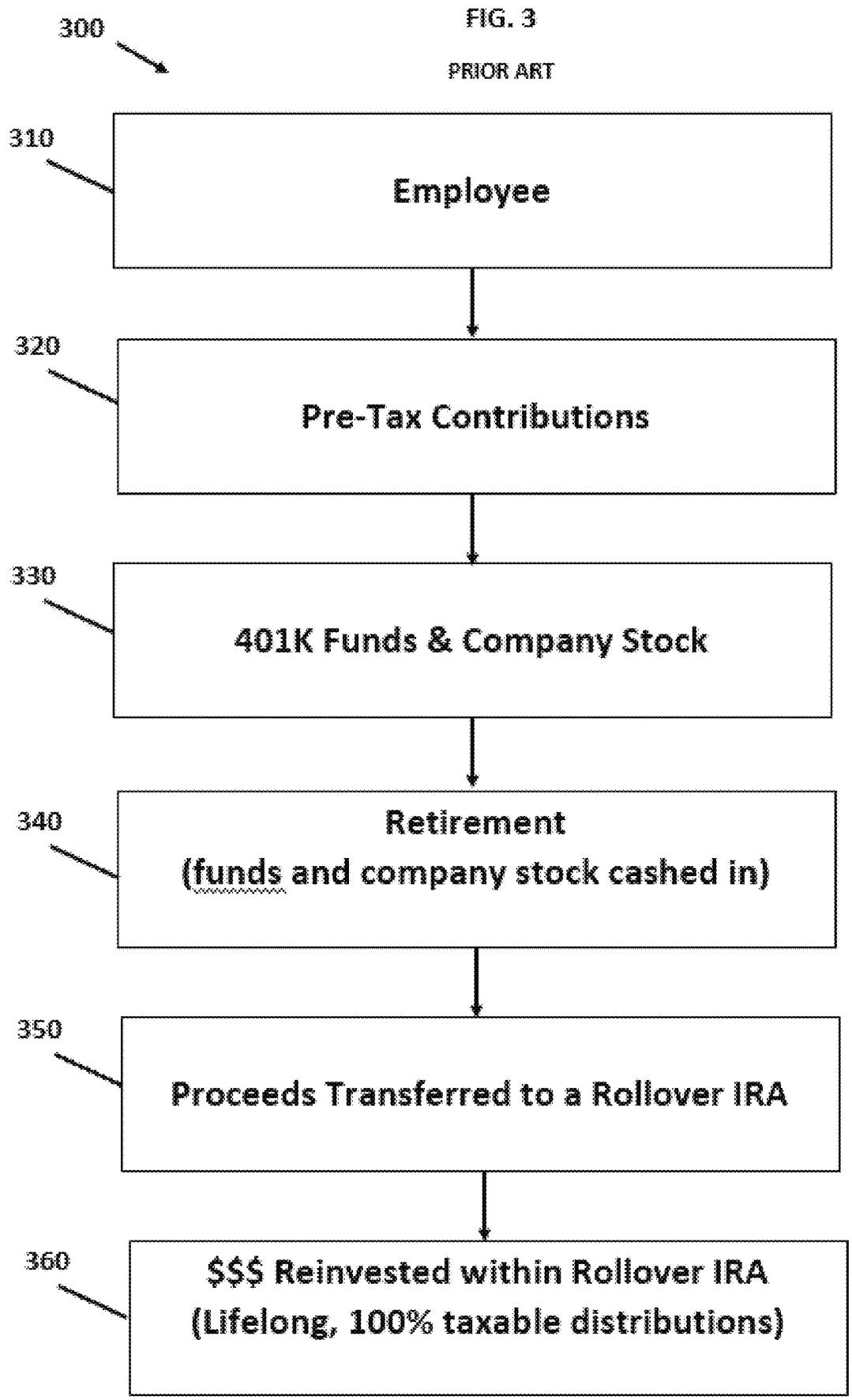
FIG. 3 is a logic diagram showing how retirement planning for individuals with publicly traded corporate stock in their company retirement accounts is currently performed.

FIG. 3 is a logic diagram 300 showing how retirement planning for individuals with publicly traded corporate stock in their company retirement accounts is currently performed. In FIG. 3, an employee (i.e., the client) 310 makes pre-tax contributions 320 to his/her 401K account 330 in which a company stock can also be accumulated through purchases, as incentives, and/or as bonuses. When the employee 310 retires, his/her 401K funds and company stock are cashed in 340 and all of the proceeds transferred 350 into the rollover IRA where the proceeds are reinvested 360 in other assets within the rollover IRA. Regardless of how the transfer takes place, under U.S. tax laws the transfers are not taxable events. Unfortunately, there are no tax savings when the employee 310 begins to withdraw funds from the rollover IRA, because withdrawn funds are 100% taxable as ordinary income at the employee's 310 then-applicable tax rate.

Figure 4:
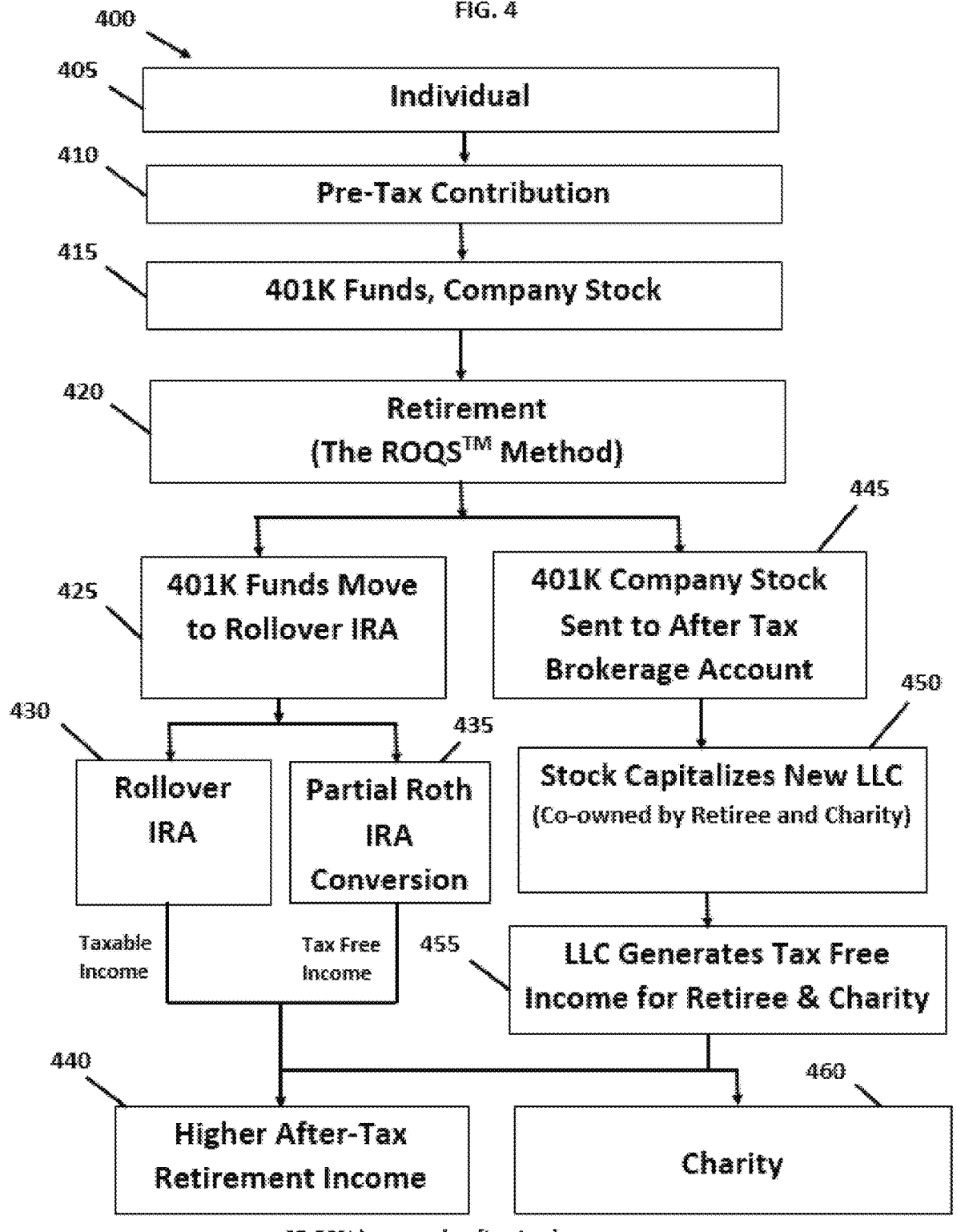
FIG. 4 is a logic diagram showing how retirement planning for individuals with publicly traded corporate stock in their company retirement accounts is performed, in accordance with various embodiments of the disclosed subject matter.

FIG. 4 is a logic diagram 400 showing how retirement planning for individuals with publicly traded corporate stock in their company retirement accounts can be performed, in accordance with various embodiments of the disclosed subject matter. In FIG. 4, an individual, for example, but not limited to, an employee 405 makes pre-tax contributions 410 to his/her 401K account 415 in which company stock can also be accumulated through purchases, as incentives, and/or as bonuses. When the employee 405 retires 420, in various embodiments of the disclosed subject matter, the 401K funds and company stock are dealt with separately. Specifically, the 401K funds must be cashed in and all of the proceeds are reinvested 425, i.e., rolled-over, in other assets within a Rollover IRA 430. However, the company stock is not transferred to the Rollover IRA, instead it is transferred 445 to an after tax brokerage NUA account, which under the U.S. tax laws is a non-taxable event. The company stock is then used to capitalize 450 a new LLC with a number of LLC units, which the employee, now a retiree, 405 has created. The retiree 405, then gifts 99% of the LLC units to at least one charity. The at least one charity and the retiree are co-owners of the LLC. However, the retiree 405 retains one percent (1%) in the form of management units and, thus, control over the LLC as a managing member. Once the value of the LLC units is obtained from a certified valuation expert, and the basis of the company stock is deducted from that value, the remaining charitable tax deduction is calculated, which is used to determine how much of the 401K funds rolled over 425 into the rollover IRA 430 can be converted to a Roth IRA 435 for the retiree.

In FIG. 4, in the LLC structure, although the retiree, or donor, 405 owns 1% and the charity owns 99% of the LLC, the retiree is the sole Managing Member and, therefore, controls the LLC. However, the charity is not without power, because, as part of the RLLC operating agreement negotiated and agreed to by the retiree 405 and the charity, the charity has approval rights over what collateral the retiree 405 must provide to ensure all loan disbursements made to the retiree 405 over the retiree's 405 life and the accrued interest on the loan is paid in full at the time of the retiree's 405 death or, at the option of the retiree-borrower during retirement. This collateral can include, for example, but is not limited to, life insurance, non-retirement assets, real estate, collateralized installment note, etc. Unfortunately, there are still no tax savings when the retiree 405 begins to withdraw funds from the Rollover IRA 430, as described above in regards to FIG. 3, because the withdrawn funds are taxed as ordinary income at the retiree's 405 then-applicable tax rate.

Figure 21:
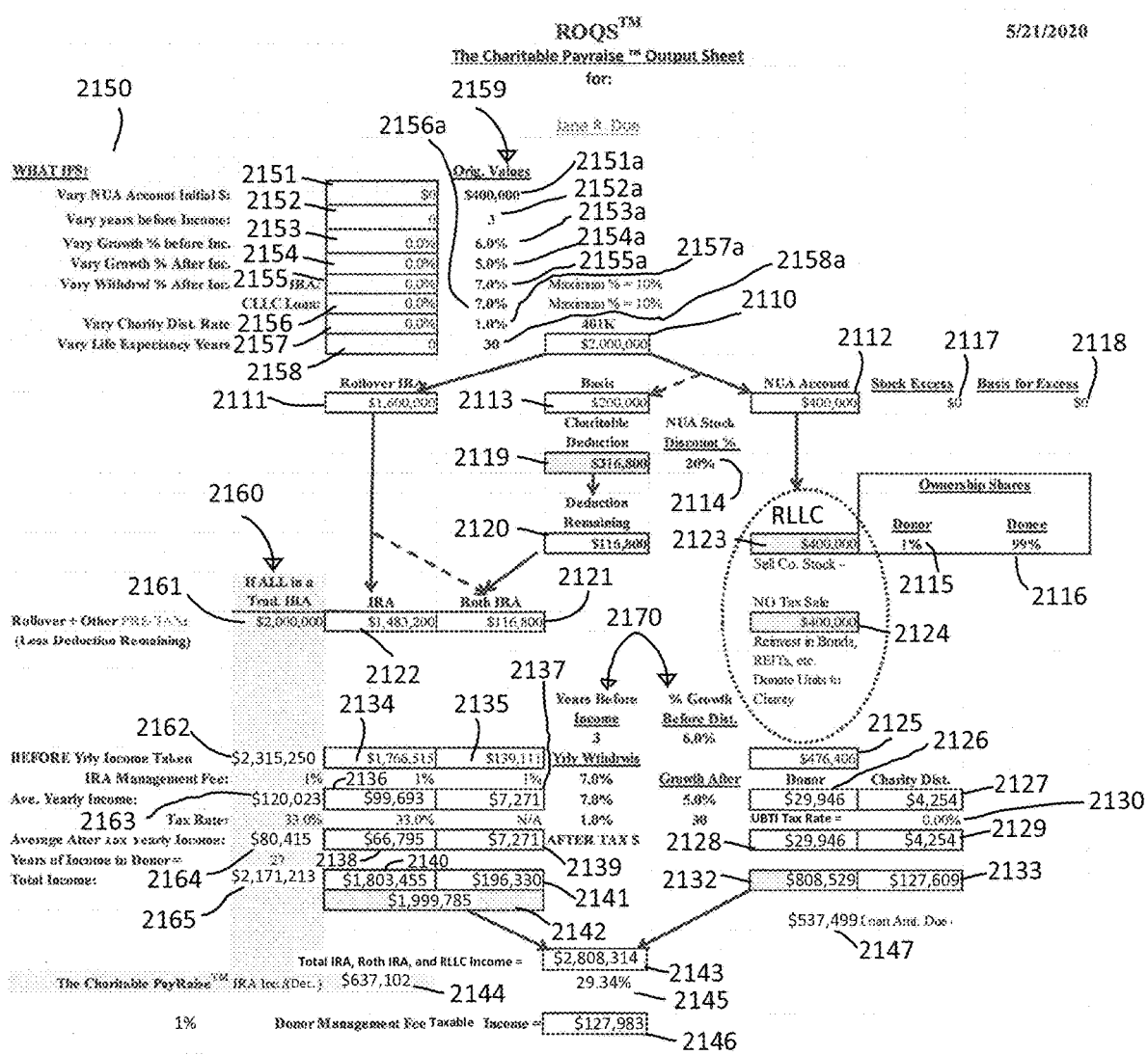
FIG. 21 is a summary scenario user interface with a what-if functionality, in accordance with other various embodiments of the disclosed subject matter.

An example of how various embodiments of the disclosed subject matter works is shown in FIG. 21 and described in greater detail below in relation thereto. In FIG. 4, once the retiree 405 begins to withdraw money from the three pools of money, only the money from the rollover IRA 430 is taxable and is taxed as ordinary income based on the retiree's then tax bracket. The money withdrawn from the Roth IRA 435 is tax free as is the money withdrawn 455 from the LLC 450 in the form of loan withdrawals 455 based on a percentage of the then-existing capital value of the LLC, for example, but not limited to, one to fifteen percent (1-15%) of the capital value of the LLC. In general, the yearly loan withdrawal 455 percentage is kept equal to or below ten (10%) to minimize the risk of reducing the capital value of the LLC below the minimum 10% of the original capital value restriction. Various embodiments permit the retiree 405 to enter the withdrawal rate percentage as an average to be used over all of the years of loan withdrawals, and other embodiments permit the retiree 405 to enter individual year-by-year loan withdrawal rates. However, the money loaned 455 to the retiree 405 from the LLC must be paid back to the LLC plus interest based on the Applicable Federal Rates (AFR) at either the base, 110%, or 120%, or 130% rate. In addition, the LLC 450 makes yearly payments to a charity 460 of a small percentage of the overall value of the LLC, for example, but not limited to, one to three percent (1-3%) of the capital value of the LLC. The payments to the charity are not loans and do not have to be repaid to the LLC, because the charity is the ultimate beneficiary of the LLC. As a result, in general, the charity receives yearly donations while the retiree 405 receives between a thirty-five-fifty percent (35-50%) improved after-tax retirement income 440 in the form of loans from the company stock value alone, and an overall improvement of between 20-25% of all retirement assets. In addition to the charity 460 receiving yearly income from the LLC, it also receives a significantly increased LLC capital value at the retiree's death due to all loans and accrued interest and accrued interest being repaid by the retiree's 405 estate.

Figure 5:
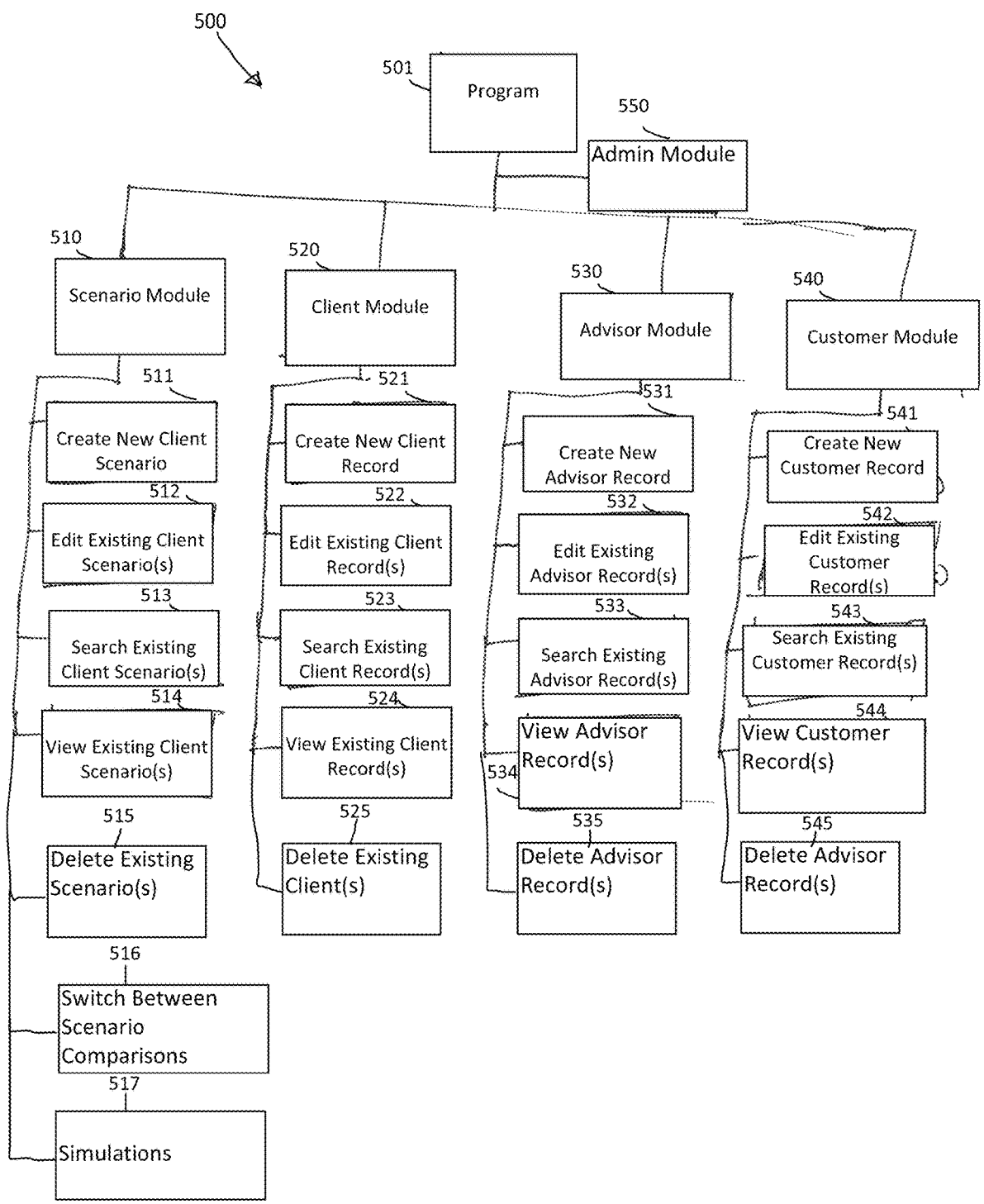
FIG. 5 an organizational chart showing the various components of a retirement planning system, in accordance with various embodiments of the disclosed subject matter.

FIG. 5 is an organizational chart showing the components of a software system 500, in accordance with various embodiments of the disclosed subject matter. In FIG. 5, the software system 500 includes a program 501 that has four (4) logical main user modules, a scenario module 510, a client module 520, an advisor module 530 and a customer module 540, plus an admin module 550, which has access restricted to users with system administrator privileges and passwords and is used to administer, deploy upgrades, and manage the software system 500.

In FIG. 5, the scenario module 510 includes a create new client scenarios submodule 511, an edit existing client scenarios submodule 512, a search existing client scenarios submodule 513, a view existing client scenarios submodule 514, a delete existing scenarios submodule 515, a switch between client scenario comparisons submodule 516, and a simulations submodule 517. The create new client scenarios submodule 511 operates to permit a user to create new and/or alternative retirement scenarios for each client added through the client module 520. The edit existing client scenarios submodule 512 operates to permit the user to edit existing client records. The search existing scenarios submodule 513 operates to permit the user to search for existing scenarios by client. The view existing client scenarios submodule 514 operates to permit the user to select and view existing client scenarios to which the user has access privileges. The delete existing client scenarios submodule 515 operates to permit the user to delete existing client scenarios to which the user has access privileges. The switch between client scenario comparisons submodule 516 operates to permit the user to switch, i.e., toggle, the Traditional Rollover IRA income to show or not show charitable contributions equivalent to those in the ROQS™ LLC charitable distributions. The simulations submodule 517 operates to permit the user to model an idealized scenario for the client by performing multiple simulations by automatically varying the client inputs using, for example, but not limited to, a Monte Carlo simulation.

In FIG. 5, the client module 520 includes a create new client record submodule 521, an edit existing client record submodule 522, a search existing client record submodule 523, a view existing client scenarios submodule 524, and a delete existing client record submodule 525. The create new client record submodule 521 operates to permit the user to create a new client record. The edit existing client record submodule 522 operates to permit the user to edit the existing client records. The search existing client records submodule 523 operates to permit the user to search the existing client records. The view existing client records submodule 524 operates to permit the user to view the existing client records to which the user has access privileges. The, delete existing client record submodule 525 operates to permit the user to delete existing client records to which the user has access privileges.

In FIG. 5, the advisor module 530 includes a create new advisor record submodule 531, an edit existing advisor record submodule 532, a search existing advisor submodule 533, a view existing scenarios submodule 534, and a delete existing advisor submodule 535. The create new advisor record submodule 531 operates to permit the user to create new advisor records. The edit existing advisor records submodule 522 operates to permit the user to edit existing advisor records. The search existing advisor record submodule 533 operates to permit the user to search the existing advisor records. The view existing advisor records submodule 524 operates to permit the user to view the existing advisor records to which the user has access privileges. The, delete existing advisor record submodule 535 operates to permit the user to delete the existing advisor records to which the user has access privileges.

In FIG. 5, the customer module 540 includes a create new customer record submodule 541, an edit existing customer record submodule 542, a search existing customer submodule 543, a view existing customer records submodule 544, and a delete existing customer records submodule 545. The create new customer record submodule 541 operates to permit the user to create new customer records. The edit existing customer record submodule 542 operates to permit the user to edit existing customer records. The search existing customer records submodule 543 operates to permit the user to search the existing customer records. The view existing customer records submodule 544 operates to permit the user to view the existing customer records to which the user has access privileges. The delete existing customer record submodule 545 operates to permit the user to delete existing customer records to which the user has access privileges.

The operations of the scenario module 510 and the related submodules 511-515 in FIG. 5 are more fully described herein in relation to FIGS. 12-19.

Figure 6:
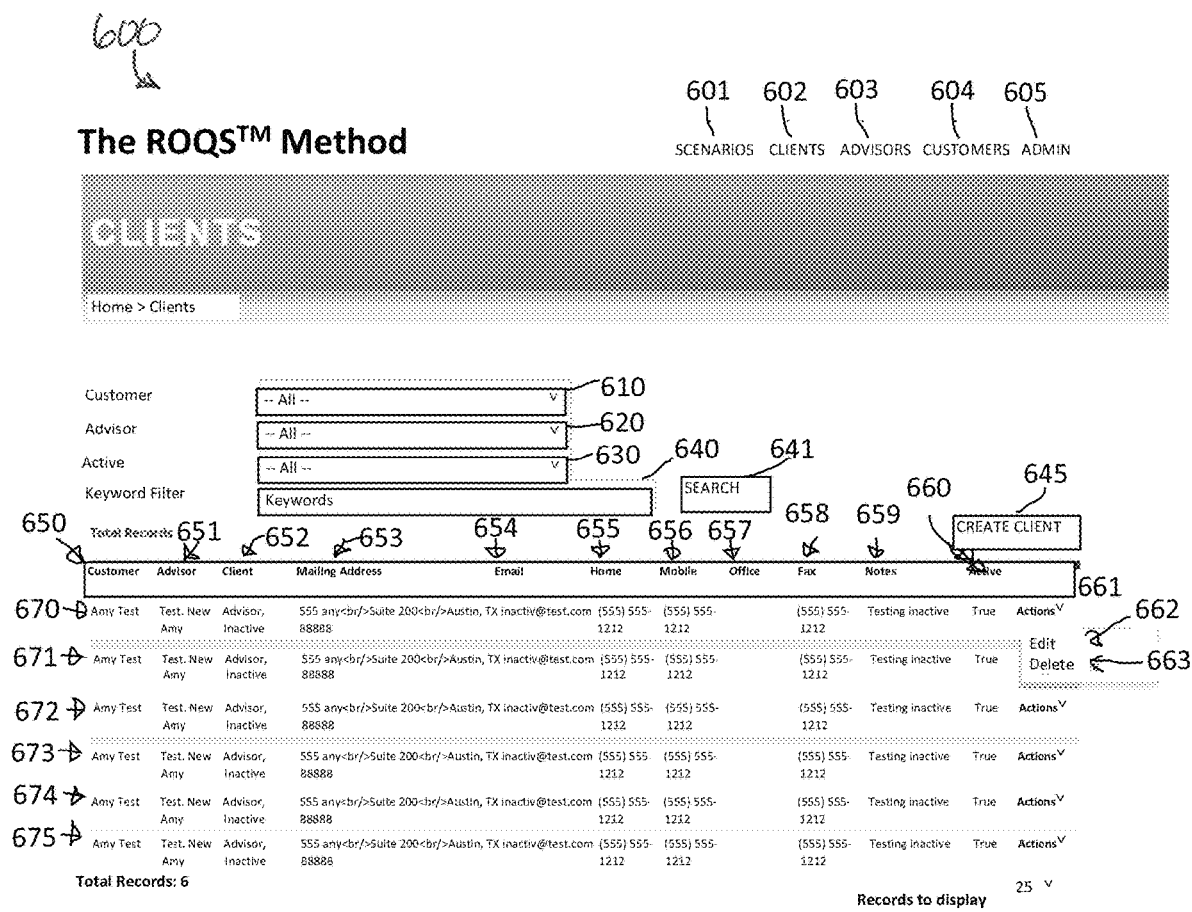
FIG. 6 is a client user interface for accessing, editing, and adding client information, in accordance with various embodiments of the disclosed subject matter.

FIG. 6 is a client user interface 600 for accessing, editing, and adding client information, in accordance with various embodiments of the disclosed subject matter. In FIG. 6, the client user interface 600 includes menu options for scenarios 601, clients 602, advisors 603, customers 604, and admin 605. In various embodiments of the disclosed subject matter, the admin 605 menu option may not be provided or will be "grayed-out" and not be accessible to the user if the user does not have an appropriate administrative-level of system access privileges. If the clients 602 menu option is selected, the client user interface 600 displays the available client records, for example, but not limited to, client records 670-675 that are available to the user based on the user's level of access. Similar to the admin 605 menu option access, each user is assigned specific access privileges by an administrator using the operations of the admin 605 menu option. The level of access privileges granted to each user specifically limits each user's ability to only be able to access data from clients, customers, and advisors with whom they have an advisory relationship, so individual client confidential data remains secure. For example, if a customer has multiple advisors working for the customer, the customer can have an assigned access privilege level that is high enough to permit the customer to access all of their advisors' records and each advisor's client's records and information. In contrast, while each customer's access privilege level can be high, the advisor's working for each customer can have access privilege levels that are much lower than each customer's and that only permit the advisor to access and view records of just the individual advisor's clients.

In FIG. 6, the client user interface 600 also displays pull down menus to enable the user to sort the client records by a specific customer 610, a specific advisor 620, active versus inactive 630, and by keyword(s) 640. The sort operations are started by a user selecting or clicking on the SEARCH button 641. Each client record 670-675 has columns containing information identifying: a customer 650 with whom the client is associated; an advisor 651 who advises the client and works for the customer 650 (Note: if the advisor 651 is an independent advisor, then the customer column will be blank); a client 652; a client mailing address 653; a client email address 654; a client home telephone number 655; a client mobile telephone number 656; a client office phone number 657; a client facsimile number 658; notes 659; active/inactive status 660; and a pull down menu of available actions 661, which includes an Edit 662 option and a Delete option 663 for the related client record. To add a new client record the user selects or clicks on a CREATE CLIENT button 645.

FIG. 7a is a new client user interface 700 for adding new client information and is reached from the client user interface 600 in FIG. 6 by selecting the CREATE CLIENT button 645, in accordance with various embodiments of the disclosed subject matter. In FIG. 7a, the new client user interface 700 is shown with a New Client title 702 and includes entry fields for a user to add the new client's information and those fields that are required are indicated with an asterisk, which can be in a different colored font. The entry fields can include: a customer field 711, which includes a pull down menu of available customer names to be selected and associated the new client; an advisor field 712, which includes a pull down menu of available advisor names associated with the customer listed in the customer field 711 to be selected and associated the new client and, if the advisor is an independent advisor, then the customer field 711 will be left blank. The add/edit user interface 700 also includes entry fields for the client's first name 713, middle name 714, last name 715, date of birth 716, a first street address portion 717, a second street address portion 718, a city 719, a state 720 with a drop down menu with a list of all fifty state names, a zip code 721, a home phone number 722, a mobile phone number 723, an office phone number 724, an email address 725, a facsimile (i.e., "fax") phone number 726, a notes field 727, and an active check box 728, which is a required field, so it must be selected or checked to indicate that the client is active in order to be able to create a new client record. After all of the client information is entered, checked, and validated, the user selects or clicks on an OK button 730 to save the new client record. If not all of the required information is entered before the user selects or clicks on the OK button 730, an error box appears above the "New Client" title with a list of the fields that are missing data. In addition, the specific fields missing data are highlighted in a different line color and the word labels are highlighted using a different font character color, for example, but not limited to, red. If, for some reason, the user decides not to save the new client record, they can select or click on a CANCEL button 731, which returns them to the client user interface 600 in FIG. 6.

FIG. 7b is an edit client user interface 701 for editing existing client information reached from the user interface in FIG. 6 by selecting or clicking on the actions menu option for the specific client's record to display a menu with the actions that the user can take and selecting or clicking on the Edit 662 option. As seen in FIG. 7b, at least all of the required fields contain information on the client and that can be edited by the user, including deselecting the active box 728, are displayed in the edit client user interface 701. When the editing is complete, the user can select the OK button 730 to save the edits to the client record. If, for some reason, the user decides not to save the edited client record, they can select or click on the CANCEL button 731, which returns them to the client user interface 600 in FIG. 6.

FIG. 8 is an advisor user interface 800 for accessing, editing, and adding advisor information, in accordance with various embodiments of the disclosed subject matter. In FIG. 8, the advisor user interface 800 includes the same menu options for scenarios 601, clients 602, advisors 603, customers 604, and admin 605 as shown in FIG. 6. In various embodiments of the disclosed subject matter, the admin 605 menu option may not be provided or will be "grayed-out" and not be accessible to the user if the user does not have an appropriate administrative-level of system access privileges. If the advisors 603 menu option is selected from the user interface 600 in FIG. 6, then the advisors user interface 800 in FIG. 8 is displayed with a listing of the available advisor records, for example, but not limited to, advisor records 850-855 that are available to the user based on the user's level of access. Using the admin 605 menu option access, each user is assigned specific access privileges by an administrator using the operations of the admin 605 menu option. The level of access privileges granted to each user specifically limits each user's ability to only be able to access data from clients, customers, and advisors with whom they have an advisory relationship, so individual client confidential data remains secure. For example, if a customer has multiple advisors working for the customer, the customer can have an assigned access privilege level that is high enough to permit the customer to access all of their advisor's and their advisor's client's records and information. In contrast, while each customer's access privilege level can be high, the advisor's working for each customer can have access privilege levels that are much lower than each customers and that only permit the advisor to access and view records of just the individual advisor's clients.

In FIG. 8, the advisor user interface 800 also displays pull down menus to enable the user to sort the advisor records by a specific customer 810, a specific advisor 820, and by keyword(s) 830. The sort operations are started by a user selecting or clicking on the SEARCH button 831. Each advisor record 850-855 has columns containing information identifying: a customer 840 with whom the advisor is associated; an advisor 841 who works for the customer 840 (Note: if the advisor 841 is an independent advisor, then the customer column will be blank); an advisor mailing address 842; an advisor email address 843; an advisor office telephone number 844; a advisor mobile phone number 845; an active/inactive status 846; and a pull down menu of available actions 851, which includes the Edit 862 option and the Delete option 8633 for the related advisor record. To add a new advisor record the user selects or clicks on a CREATE ADVISOR button 835.

FIG. 9a is a new advisor user interface 900 for adding advisor information reached from the advisor user interface 800 in FIG. 8 after the user selects or clicks on the CREATE ADVISOR button 835, in accordance with various embodiments of the disclosed subject matter. In FIG. 9a, the new advisor user interface 900 is shown with a New Advisor title 902 and includes entry fields for a user to add the new advisor's information and those fields that are required are indicated with an asterisk, which can be in a different colored font. The entry fields can include: a customer field 905, which includes a pull down menu of available customer names to be selected and associated the new advisor, but, if the advisor is an independent advisor, then the customer field 905 will be left blank. The new advisor user interface 900 also includes entry fields for the advisor's first name 910, last name 915, a first street address portion 920, a second street address portion 925, a city 930, a state 935 with a drop down menu with a list of all fifty state names, a zip code 940, a mobile phone number 945, an office phone number 950, an email address 955, a facsimile (i.e., "fax") phone number 960, and an active check box 965, which is a required field, so it must be selected or checked to indicate that the advisor is active in order to be able to create a new advisor record. After all of the advisor information is entered, checked, and validated, the user selects or clicks on an OK button 970 to save the new client record. If not all of the required information is entered before the user selects or clicks on the OK button 970, an error box appears above the "New Advisor" title with a list of the fields that are missing data. In addition, the specific fields missing data are highlighted in a different line color and the word labels are highlighted using a different font character color, for example, but not limited to, red. If, for some reason, the user decides not to save the new advisor record, they can select or click on a CANCEL button 971, which returns them to the advisor user interface 800 in FIG. 8.

FIG. 9b is an edit advisor user interface 901 for editing existing advisor information reached from the user interface 800 in FIG. 8 by selecting or clicking on the actions menu option for the specific advisor's record to display a menu with the actions that the user can take and selecting or clicking on the Edit 862 option. In FIG. 9b, the edit advisor user interface 901 is shown with an Edit Advisor title 903 and includes entry fields for a user to edit the existing advisor's information and those fields that are required are indicated with an asterisk, which can be in a different colored font. As seen in FIG. 9b, at least all of the required fields contain information on the client and can be edited by the user, including deselecting the active box 965. When the editing is complete, the user can select the OK button 970 to save the edits to the advisor record. If, for some reason, the user decides not to save the edited advisor record, they can select or click on the CANCEL button 971, which returns them to the advisor user interface 800 in FIG. 8.

Figure 10:
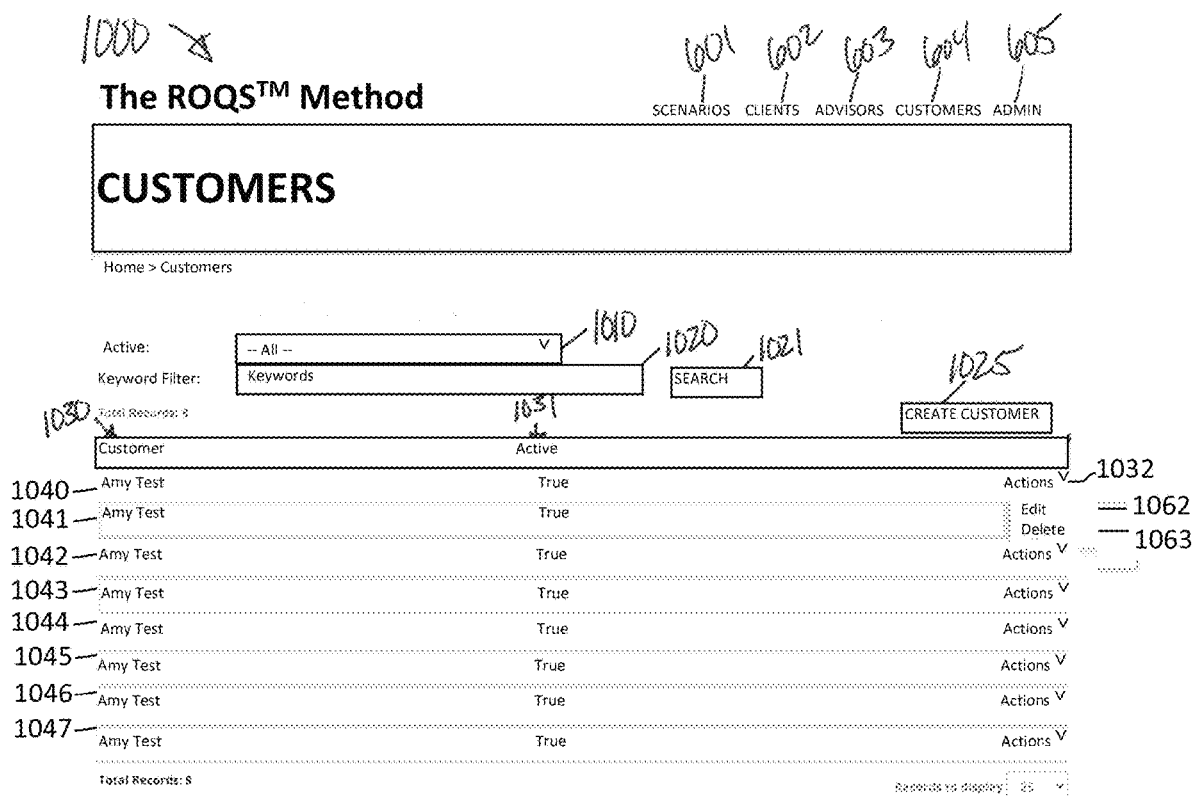
FIG. 10 is a customer user interface for accessing, editing, and adding customer information, in accordance with various embodiments of the disclosed subject matter.

FIG. 10 is a customer user interface 1000 for accessing, editing, and adding customer information, in accordance with various embodiments of the disclosed subject matter. In FIG. 10, the advisor user interface 1000 includes the same menu options for scenarios 601, clients 602, advisors 603, customers 604, and admin 605 as shown in FIG. 6. In various embodiments of the disclosed subject matter, the admin 605 menu option may not be provided or will be "grayed-out" and not be accessible to the user if the user does not have an appropriate administrative-level of system access privileges. If the customers 604 menu option is selected from the user interface 600 in FIG. 6, then the advisors user interface 1000 in FIG. 10 is displayed with a listing of the available customer records, for example, but not limited to, customer records 1040-1047 that are available to the user based on the user's level of access. Using the admin 605 menu option access, each user is assigned specific access privileges by an administrator using the operations of the admin 605 menu option. The level of access privileges granted to each user specifically limits each user's ability to only be able to access data from clients, customers, and advisors with whom they have an advisory relationship, so individual client confidential data remains secure. For example, if a customer has multiple advisors working for the customer, the customer can have an assigned access privilege level that is high enough to permit the customer to access all of their advisor's and their advisor's client's records and information. In contrast, while each customer's access privilege level can be high, the advisor's working for each customer can have access privilege levels that are much lower than each customers and that only permit the advisor to access and view records of just the individual advisor's clients.

In FIG. 10, the customer user interface 1000 also displays pull down menus to enable the user to sort the customer records whether the customer is active or inactive 1010, and by keyword(s) 1020. A user selecting or clicking on the SEARCH button 1021 starts the sort operations. Each customer record 1040-1047 has columns containing information identifying: a customer 1030; an active/inactive status 1031; and a pull down menu of available actions 1032, which includes an Edit 1062 option and a Delete option 1063 for the related customer record. To add a new customer record the user selects or clicks on a CREATE CUSTOMER button 1025.

Figure 11A:
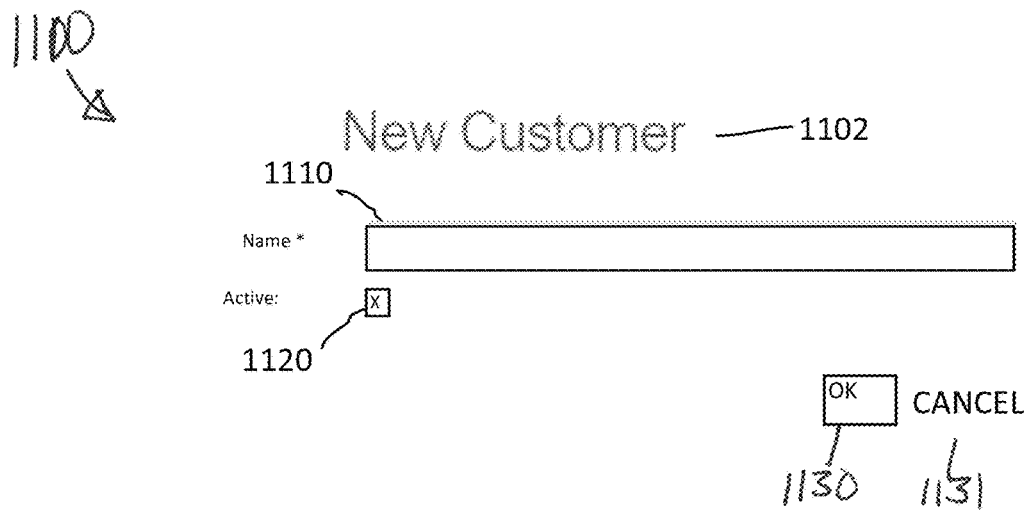
FIG. 11a is a new customer user interface for adding customer information reached from the user interface in FIG. 10, in accordance with various embodiments of the disclosed subject matter.

FIG. 11a is a new customer user interface 1100 for adding new customer information reached from the customer user interface 1000 in FIG. 10 after the user selects or clicks on the CREATE CUSTOMER button 1025, in accordance with various embodiments of the disclosed subject matter. In FIG. 11a, the new customer user interface 1100 is shown with a New Customer title 1102 and includes entry fields for a user to add the new customer's information and those fields that are required are indicated with an asterisk, which can be in a different colored font. The entry field(s) can include: customer name field 1110 and an active check box 1120. After the customer information is entered, checked, and validated, the user selects or clicks on an OK button 1130 to save the new customer record. If not all of the required information is entered before the user selects or clicks on the OK button 1130, an error box appears above the "New Customer" title with a list of the fields that are missing data. In addition, the specific fields missing data are highlighted in a different line color and the word labels are highlighted using a different font character color, for example, but not limited to, red. If, for some reason, the user decides not to save the new customer record, they can select or click on a CANCEL button 1131, which returns them to the customer user interface 1000 in FIG. 10.

Figure 11B:
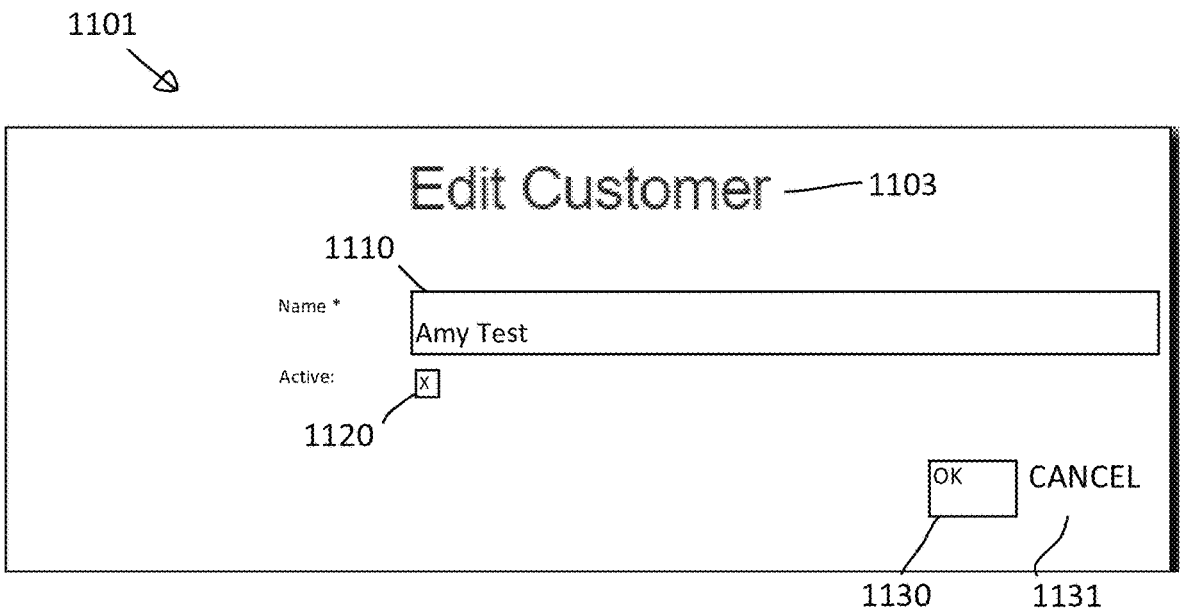
FIG. 11b is an edit customer user interface 1101 for editing existing customer information reached from the customer user interface 1000 in FIG. 10, in accordance with various embodiments of the disclosed subject matter.

FIG. 11b is an edit customer user interface 1101 for editing existing customer information reached from the customer user interface 1000 in FIG. 10 by selecting or clicking on the actions menu option for the specific customer's record to display a menu with the actions that the user can take and selecting or clicking on the Edit 1062 option. In FIG. 11b, the edit customer user interface 1101 is shown with an Edit Customer title 1103 and includes the same entry fields as in FIG. 11a for a user to edit the selected customer's information and those fields that are required are indicated with an asterisk, which can be in a different colored font. As seen in FIG. 11b, the customer name field 1110 is the only required field and contains name information on the client and can be edited by the user. In addition, the user has the option of deselecting the active box 1120. When the editing is complete, the user can select the OK button 1130 to save the edits to the advisor record. If, for some reason, the user decides not to save the edited client record, they can select or click on the CANCEL button 1131, which returns them to the advisor user interface 1000 in FIG. 10.

FIG. 12 is a scenario user interface 1200 for accessing, editing, and adding client scenario information, in accordance with various embodiments of the disclosed subject matter. In FIG. 12, the scenario user interface 1200 includes menu options for scenarios 601, clients 602, advisors 603, customers 604, and admin 605 as shown in FIG. 6. In various embodiments of the disclosed subject matter, in FIG. 12, the admin 605 menu option may not be provided or will be "grayed-out" and not be accessible to the user if the user does not have an appropriate administrative-level of system access privileges. If the scenarios 601 menu option is selected, the client user interface 600 displays the available client records, for example, but not limited to, customer records 1280-1282 that are available to the user based on the user's level of access. Similar to the admin 605 menu option access, each user is assigned specific access privileges by an administrator using the operations of the admin 605 menu option. The level of access privileges granted to each user specifically limits each user's ability to only be able to access data from clients, customers, and advisors with whom they have an advisory relationship, so individual client confidential data remains secure. For example, if a customer has multiple advisors working for the customer, the customer can have an assigned access privilege level that is high enough to permit the customer to access all of its advisor's and their advisor's client's records and information. In contrast, while each customer's access privilege level can be high, the advisor's working for each customer can have access privilege levels that are much lower than each customers and that only permit the advisor to access and view records of just that individual advisor's clients.

In FIG. 12, the scenario user interface 1200 also displays pull down menus to enable the user to sort the client records by a specific customer 1210, a specific advisor 1220, a specific client 1230, an active versus inactive status 1240, and by keyword(s) 1250. The sort operations are started by a user selecting or clicking on the SEARCH button 1251. Each client record 1280-1282 has columns containing information identifying: a customer name 1260 with whom the client is associated; an advisor name 1261 who advises the client and works for the customer 1260 (Note: if the advisor 1261 is an independent advisor, then the customer column, generally, will be blank); a client name 1262; a client birthday 1263; a notes 1264; an active/inactive status 1265; and a pull down menu of available actions 1271, which includes a View option, 1272, an Edit option 1273, and a Delete option 1274 for the related client record. To add a new scenario record the user selects or clicks on a CREATE SCENARIO button 1255.

In FIG. 13a, the new scenario user interface 1300 for adding new scenario information and is reached from the client user interface 600 in FIG. 6 by selecting the CREATE SCENARIO button 1255, in accordance with various embodiments of the disclosed subject matter. In FIG. 13a, the new scenario user interface 1300 is shown with a New Scenario title 1301 and includes entry fields for a user to add the new scenario's information and those fields that are required are indicated with an asterisk, which can be in a different colored font. The entry fields can include: a customer field 1302, which includes a pull down menu of available customer names to be selected and associated the new client; an advisor field 1303, which includes a pull down menu of available advisor names associated with the customer listed in the customer field 1302 to be selected and associated the new client and, if the advisor is an independent advisor, then the customer field 1302 will be left blank. The new scenario user interface 1300 further includes: a client field 1304, which includes a pull down menu of available clients to select the correct client; a retirement state field 1305, which includes a pull down menu of available states to select the correct state name; pre-distribution state & Federal combined tax rate 1306; a post-distribution State & Federal combined tax rate 1307; a current 401K total value 1308, a company NUA stock basis field 1309; a company NUA stock fair market value (FMV) 1310; a value of other 401K funds 1311; an other pre-tax retirement assets 1312; a company stock symbol 1313; and an inputted stock value discount for charitable deduction 1314.

In FIG. 13a, the new scenario user interface 1300 also includes fields to enter information for: a date to sever assets from current retirement plan 1315; a number of years until donor income from company NUA stock 1316; a growth rate prior to distribution 1317; a growth rate after distribution 1318; a yearly donor withdrawal rate 1319, a yearly charitable withdrawal rate 1320, a life expectancy for the donor 1321, which includes a pull down menu to select the number of years, for example, from 1 to 30; an incorporation state for the RLLC 1322, which includes a pull down menu with all fifty states to select from; a LLC name 1323; a RLLC loan interest rate 1324, which is based on the AFR and is automatically updated monthly; a life insurance policy value 1325 death benefit; notes 1326; and an active status 1327. A view scenario button 1340 is initially not active, but becomes active when enough information is entered to permit the system to calculate the. After all of the client information is entered, checked, and validated, the user selects or clicks on an OK button 1330 to save the new scenario record. If not all of the required information is entered before the user selects or clicks on the OK button 1330, an error box appears above the "New Scenario" title 1301 with a list of the fields that are missing data. In addition, the specific fields missing data are highlighted in a different line color and the word labels are highlighted using a different font character color, for example, but not limited to, red. If, for some reason, the user decides not to save the new scenario record, they can select or click on a CANCEL button 1331, which returns them to the client user interface 1200 in FIG. 12.

FIG. 13b is an edit scenario user interface 1301 for editing existing scenario information reached from the scenario user interface in FIG. 12 by selecting or clicking on the actions menu option for the specific client's record to display a menu with the actions that the user can take and selecting or clicking on the View 1262 option. As seen in FIG. 13b, at least all of the required fields contain information on the scenario and can be edited by the user, including deselecting the active box 1327. When the editing is complete, the user can select the OK button 1330 to save the edits to the client record. If, for some reason, the user decides not to save the edited scenario record, they can select or click on the CANCEL button 1331, which returns them to the client user interface 1200 in FIG. 12.

Figure 14:
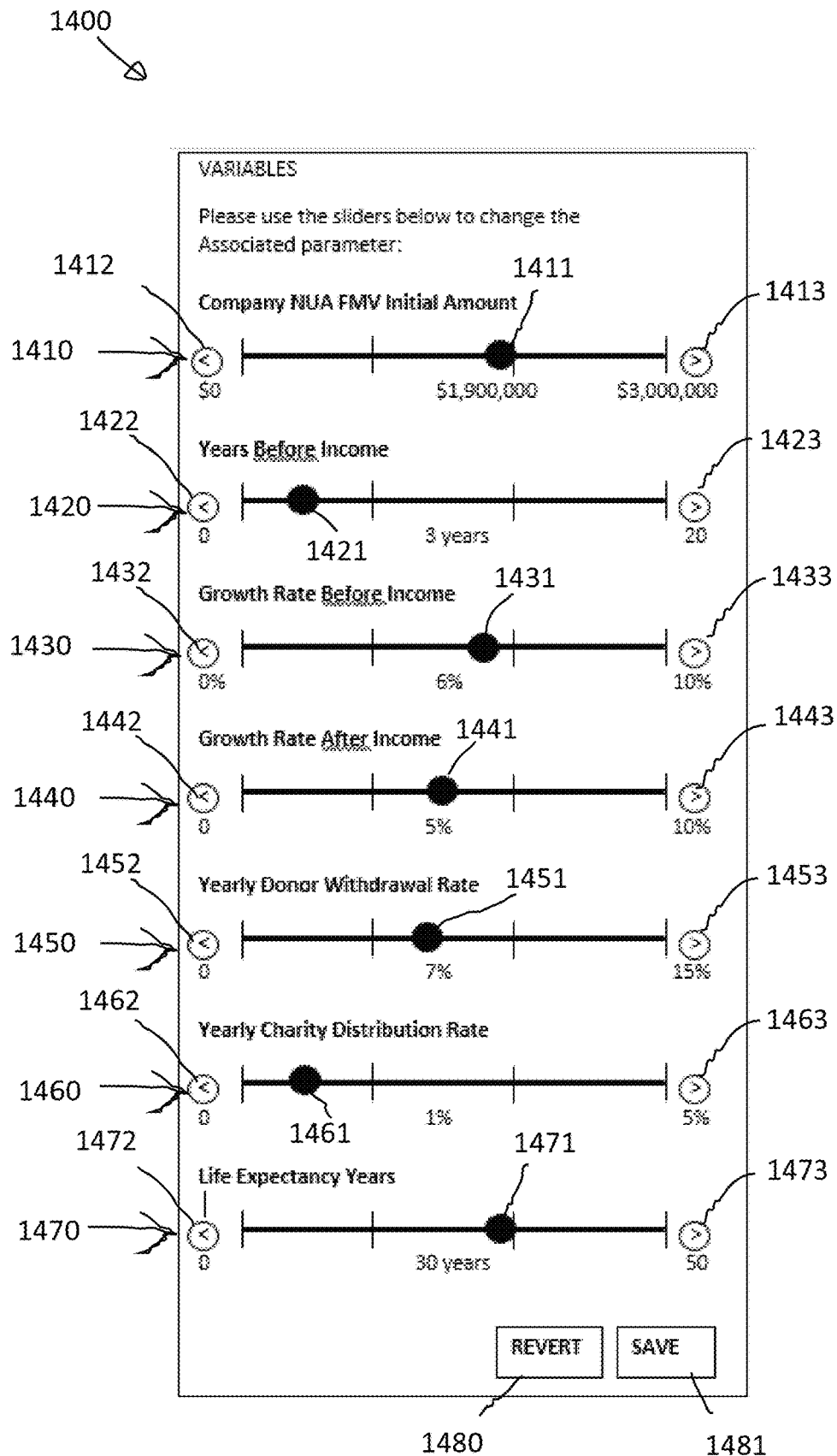
FIG. 14 is a variable user interface for editing existing scenario information of FIG. 12, in accordance with various embodiments of the disclosed subject matter.

FIG. 14 is a variable user interface control 1400 used to change the scenario information of FIG. 12 when the scenario information is viewed, in accordance with various embodiments of the disclosed subject matter. In FIG. 14, the variable user interface control 1400 includes dynamically adjustable control elements including a company NUA FMV initial amount control 1410, a years before income control 1420, a growth rate before income control 1430, a growth rate after income control 1440, a yearly donor withdrawal rate control 1450, a yearly charity distribution rate control 1460, and a life expectancy control 1470. As a variable is changed, the system recalculates the final values for the scenario and immediately updates the graphs and charts displayed in user interfaces in FIGS. 15-19. Each of the controls in FIG. 14 can be controlled in at least two ways. First, by either placing the mouse over a moveable icon, for example, but not limited to, a first slider button 1411 in the company NUA FMV initial amount control 1410, clicking and holding the left mouse button and then dragging the first slider button 1411 to the left or right. Second, by placing the mouse over a left icon, for example, but not limited to, a first left button 1412 in the company NUA FMV initial amount control 1410, clicking the left mouse button to move the first slider button 1411 to the left by a predetermined amount, or, by placing the mouse over a right icon, for example, but not limited to, a first right button 1413 in the company NUA FMV initial amount control 1410, clicking the left mouse button to move the first slider button 1411 to the right by a predetermined amount. This amount can be, for example, but is not limited to, $50,000, $100,000, or more per click in the company NUA FMV initial amount control 1410. Similarly, for the years before income control 1420, by either placing the mouse over a moveable icon, for example, but not limited to, a second slider button 1421 in, clicking and holding the left mouse button and then dragging the second slider button 1421 to the left or right. Second, by placing the mouse over a left icon, for example, but not limited to, a second left button 1422 in the years before income control 1420, clicking the left mouse button to move the second slider button 1421 to the left by a predetermined amount, or, by placing the mouse over a right icon, for example, but not limited to, a second right button 1423 in the years before income control 1420, clicking the left mouse button to move the second slider button 1421 to the right by a predetermined amount. This amount can be, for example, but is not limited to, in 1 year increments per click in the years before income control 1420.

In FIG. 14, the same functionality as described above also applies to a third slider button 1431, a third left button 1432, and a third right button 1433 for the growth rate before income control 1430, with, for example, the movement increments being in 1% increments. Similarly, this also applies to a fourth slider button 1441, a fourth left button 1442, and a fourth right button 1443 for the growth rate after income control 1440, with, for example, the movement increments being in 1% increments. Likewise, this also applies to a fifth slider button 1451, a fifth left button 1452, and a fifth right button 1453 for the yearly donor withdrawal rate control 1450, with, for example, the movement increments being in 1% increments. As before, this also applies to a sixth slider button 1461, a sixth left button 1462, and a sixth right button 1463 for the yearly charity distribution rate control 1460, with, for example, the movement increments being in 1% increments. Finally, for the embodiment shown in FIG. 14, this also applies to a seventh slider button 1471, a seventh left button 1472, and a seventh right button 1473 for the Life Expectancy control 1470, with, for example, the movement increments being in 1-year increments. While in the example in FIG. 14 there are seven (7) controls 1410, 1420, 1430, 1440, 1450, 1460, and 1470, in other embodiments, there can be more or less controls and the increments of change for each measured in $, years, or %, can be in increments that are higher or lower than those discussed above in regard to FIG. 14.

In FIG. 14, if the user decides the changes made to the scenario should be deleted and the original scenario variables reset, the user clicks on or selects a REVERT button 1480 to return the variables to the original values for the scenario. However, if the user decides the changes made to the scenario should be saved and the original scenario variables replaced, the user clicks on or selects a SAVE button 1481 to save the currently displayed variables and replace the original values for the scenario. The user will be asked to confirm that he/she wants to save the new scenario variables and replace the original scenario variables to ensure the user really wants to save the new scenario. For example, but not limited to, by displaying a pop-up window that asks the user to confirm that they want to replace the original scenario with the new scenario. As a result, the user has an opportunity to not replace the starting scenario values with the just changed values.

Figure 15:
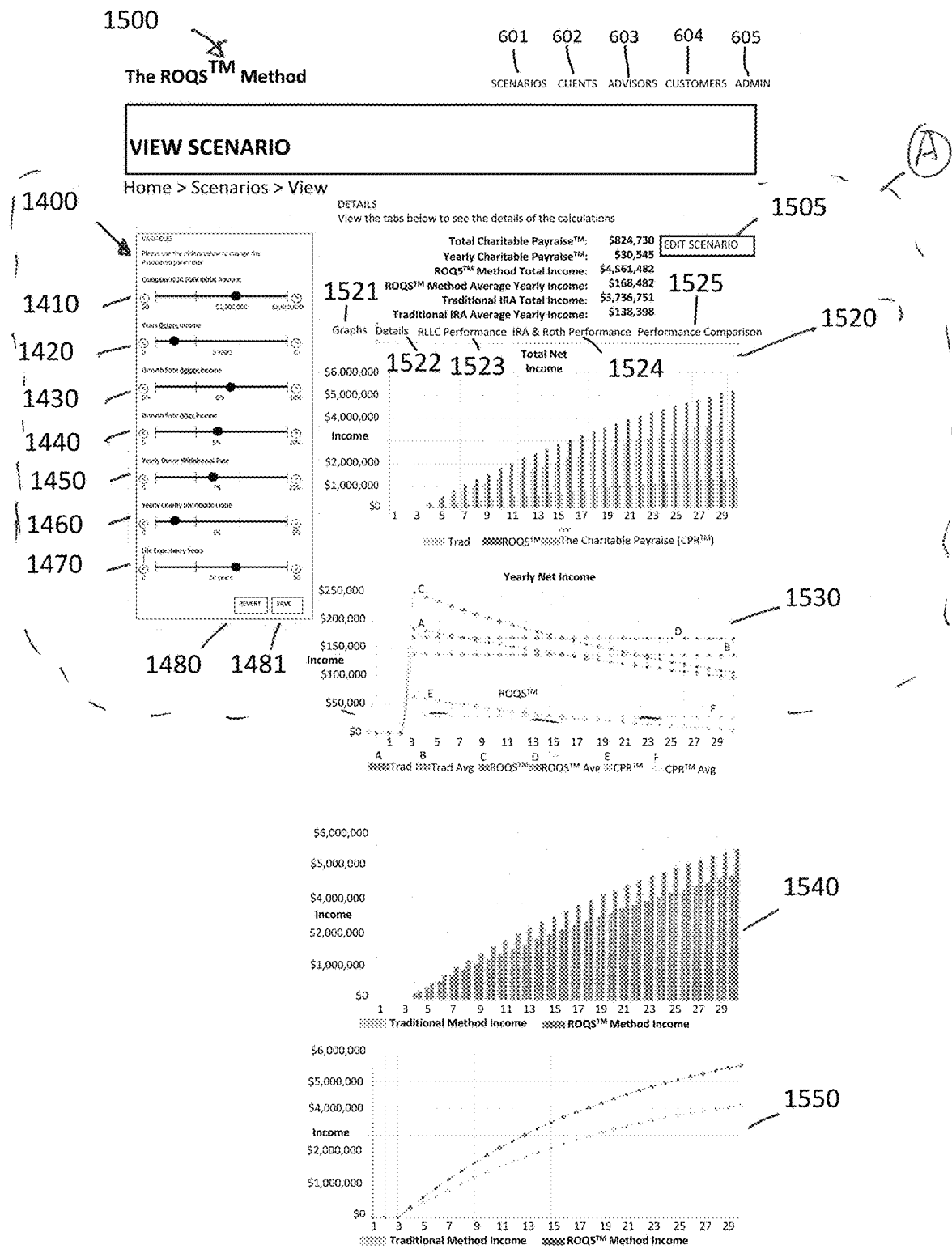
FIG. 15 is a view scenario graphs user interface for viewing existing graphical scenario performance information and changing the inputs and viewing the effect the changes have on the performance of the scenario, in accordance with various embodiments of the disclosed subject matter.

FIG. 15 is a view scenario graphs user interface 1500 for viewing existing graphical scenario performance information and changing the inputs and viewing in real time the effect the changes have on the performance of the scenario, in accordance with various embodiments of the disclosed subject matter. In FIG. 15, a view scenario graph user interface option 1521 is highlighted to indicate that it has been selected and which includes the variable user interface control 1400 of FIG. 13, as well as multiple graphs 1520, 1530, 1540, and 1550 that show comparisons between the performance of an example embodiment of the disclosed subject matter against the performance of a traditional rollover IRA plan over an identical time period. Also shown are options to view the scenario results in other user interfaces, for example, a view scenario details user interface option 1521, a view scenario RLLC performance user interface option 1523, a view scenario IRA & ROTH performance user interface option 1524, and a view scenario performance comparison user interface option 1525. These additional options are described below in detail in relation to FIGS. 17-20, respectively. In FIG. 15, an edit scenario button 1505 is shown, which, upon being clicked or selected by the user, takes the user to the edit scenario user interface 1301 of FIG. 13b where the user can edit all of the scenario values, including those that are not included on the variable user interface control 1400.

Figure 16:
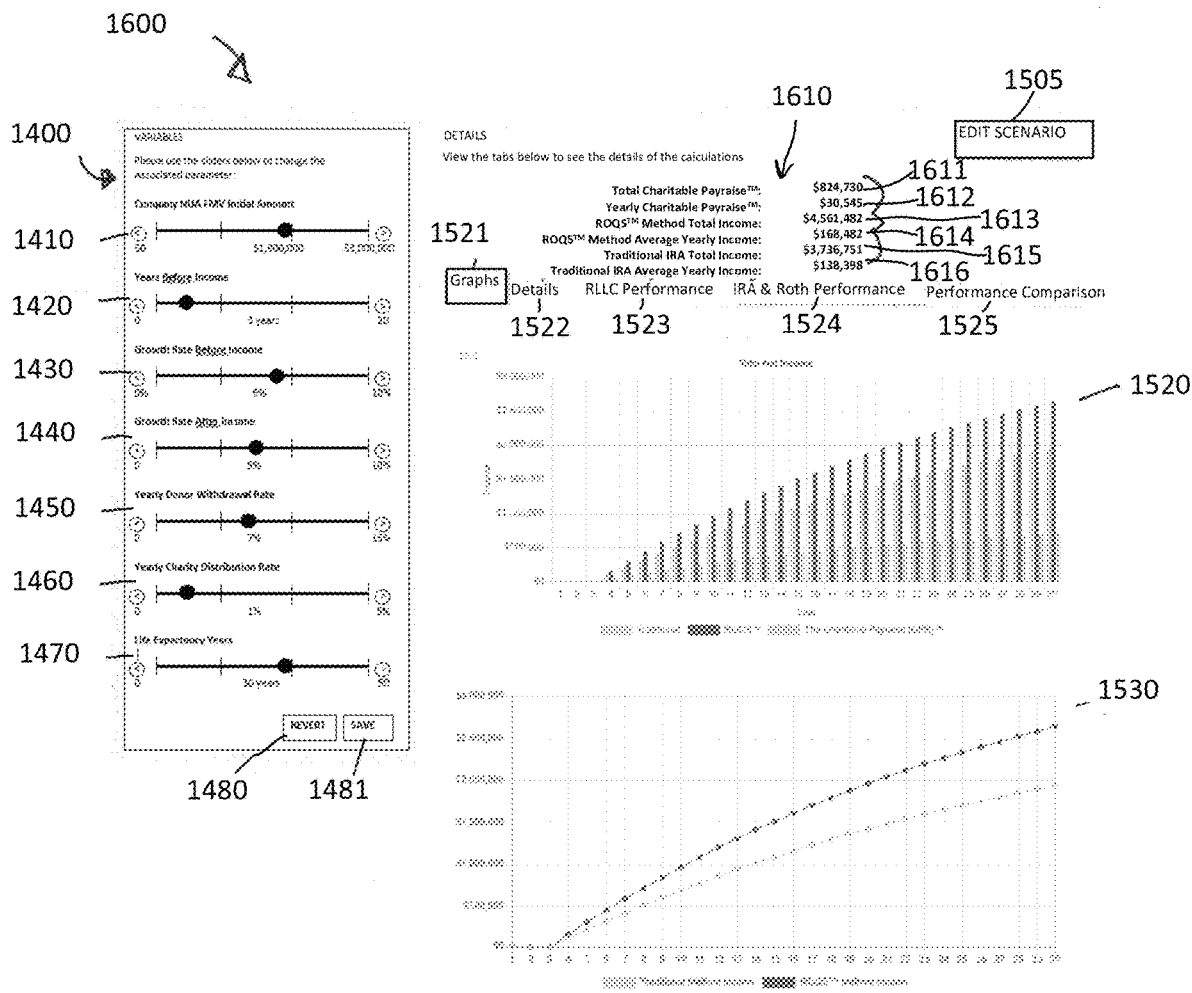
FIG. 16 is a close up view of area A in the user interface in FIG. 15, in accordance with various embodiments of the disclosed subject matter.

FIG. 16 is a close up view 1600 of area A in the user interface in FIG. 15, in accordance with various embodiments of the disclosed subject matter. In FIG. 16, a summary performance details section 1610 includes: the dollar values for a total performance amount 1611 for the RLLC portion from the shown embodiment of the disclosed subject matter; a yearly performance amount 1612 for the RLLC portion from shown embodiment of the disclosed subject matter; a total income amount 1613 for all of the shown embodiment of the disclosed subject matter; an average yearly income amount 1614 for all of the shown embodiment of the disclosed subject matter; a total income amount 1615 for a traditional IRA plan; and an average yearly income amount 1616 for the traditional IRA plan. The yearly and total detailed information for these amounts are also shown graphically in graphs 1520 and 1530.

Figure 17:
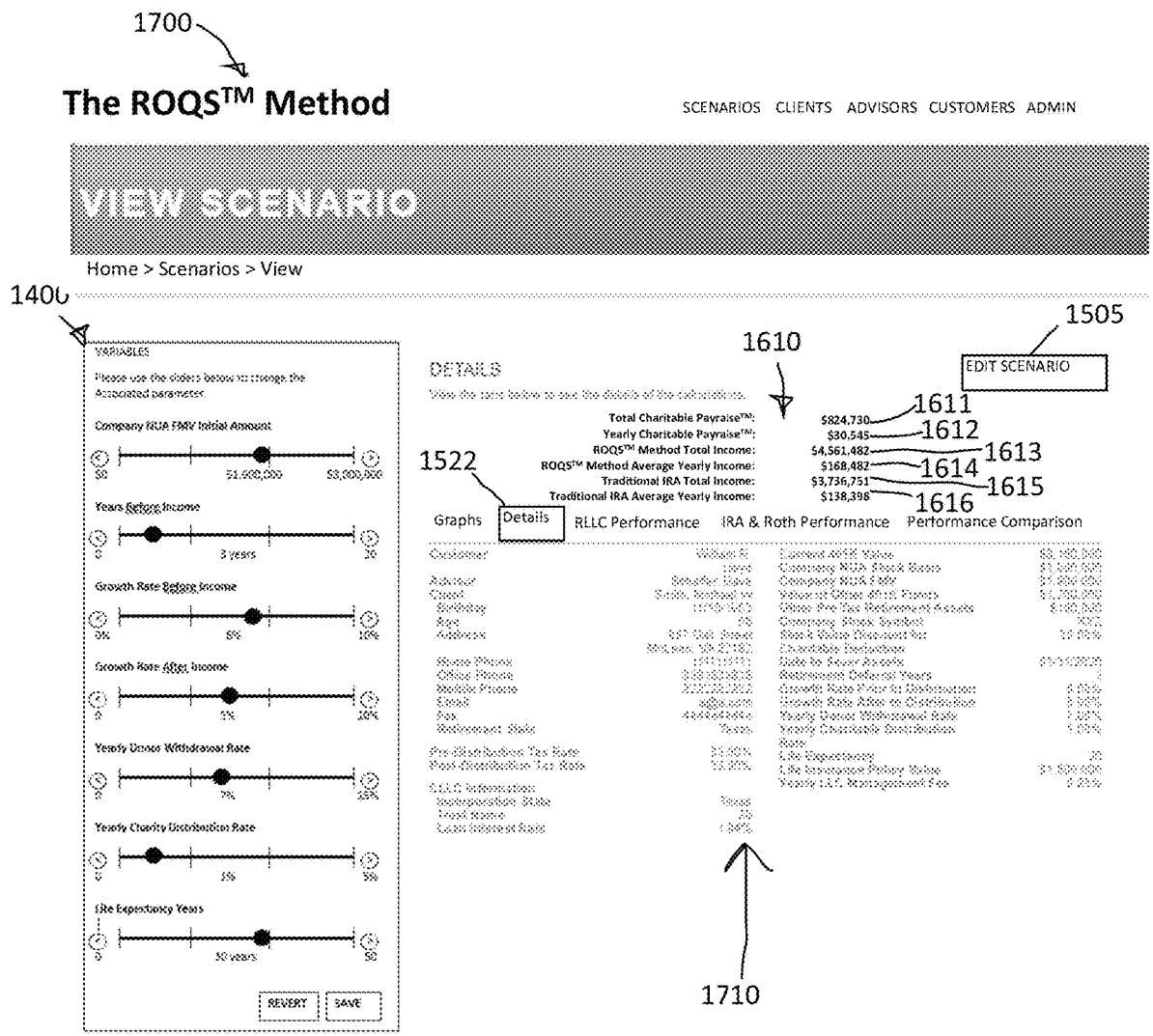
FIG. 17 is a view scenario details user interface for accessing, editing, and varying existing scenario information, in accordance with various embodiments of the disclosed subject matter.

FIG. 17 a view scenario details user interface 1700 for accessing, editing, and varying existing scenario information, in accordance with various embodiments of the disclosed subject matter. In FIG. 17, the view scenario details user interface option 1522 is highlighted to show it has been selected and the detail information for the scenario is displayed below. As described above, the variable user interface control 1400 is operable to change the input variables for the scenario, which dynamically updates the numbers in the summary performance details section 1610 as well as the detailed data fields shown in a details section 1710 of the view scenario details user interface 1700. As in FIG. 15, the edit scenario button 1505 is shown, which, upon being clicked or selected by the user, takes the user to the edit scenario user interface 1301 in FIG. 13b where the user can edit and save all of the scenario values, including those that are not included on the variable user interface control 1400.

Figure 18:
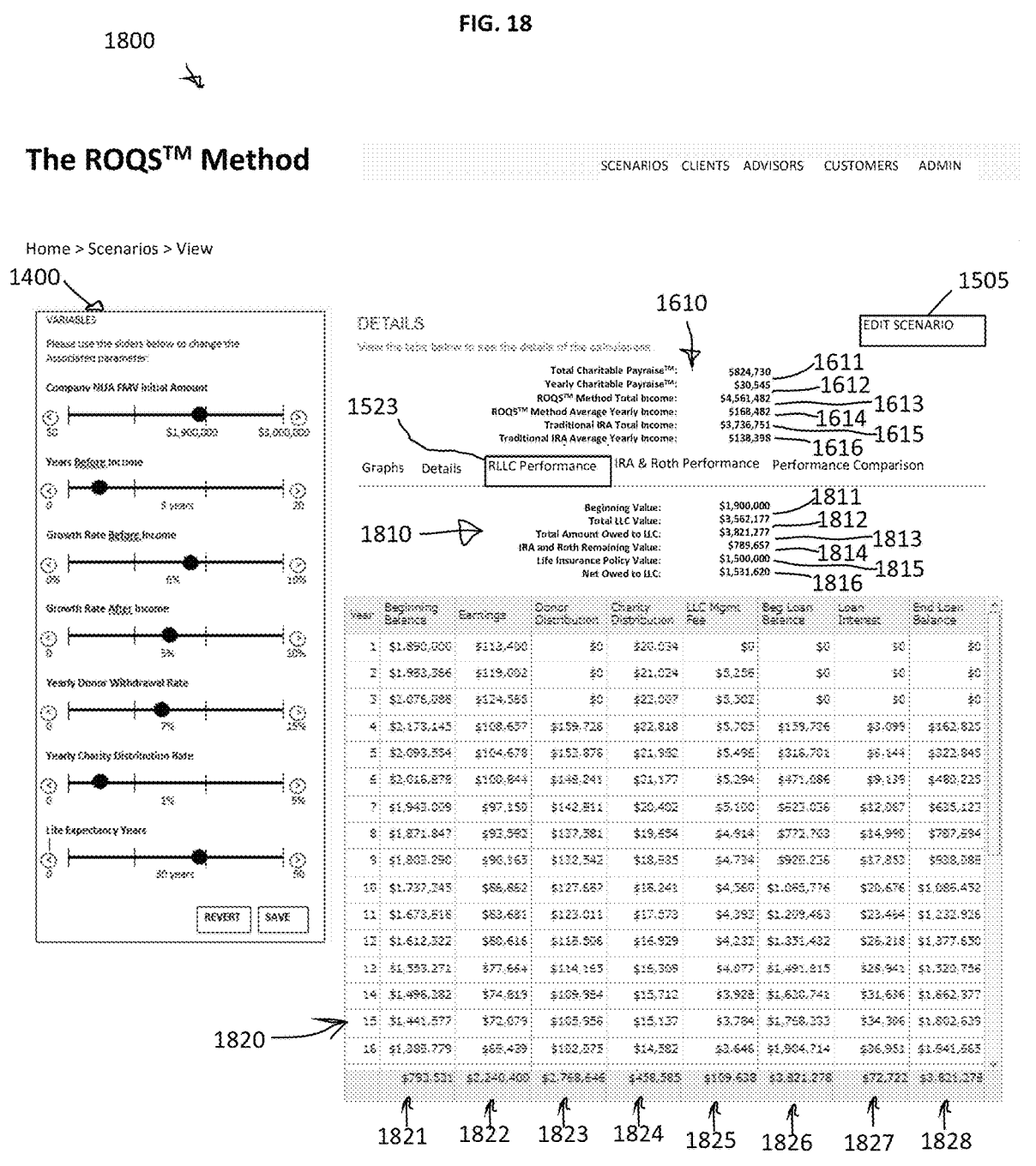

FIG. 18 a view scenario RLLC performance user interface 1800 for accessing, editing, and varying existing scenario information, in accordance with various embodiments of the disclosed subject matter. In FIG. 18, the view scenario RLLC performance user interface option 1523 is highlighted to show it has been selected and the RLLC performance information for the scenario is displayed below. As described above, the variable user interface control 1400 is operable to change the input variables for the scenario, which dynamically updates the numbers in the summary performance RLLC performance section 1610 as well as the detailed data fields shown in a RLLC performance section 1810 of the view scenario RLLC performance user interface 1700 in FIG. 17. In FIG. 18, the RLLC performance section 1810 includes output information for a beginning dollar value in the RLLC 1811 from the shown embodiment of the disclosed subject matter; a total distributions and final RLLC value 1812 for the shown embodiment of the disclosed subject matter; a total amount owed to the RLLC 1813 by the donor for the shown embodiment of the disclosed subject matter; a total IRA and Roth IRA remaining value 1814 for the shown embodiment of the disclosed subject matter; a donor life insurance policy death benefit value 1815; and a net amount owed to the RLLC 1816. The RLLC performance section 1810 also includes a table 1820 with columns that list: a total beginning capital value of the RLLC 1821; yearly interest earnings 1822 on the capital in the RLLC; a yearly donor loan amount 1823 taken from the RLLC; a yearly charity distribution 1824 paid to the charity-owner; a yearly RLLC management fee 1825; a yearly cumulative beginning loan balance 1826, i.e., the principal and interest; a yearly loan interest amount 1827; and a cumulative ending loan balance 1828, which includes all donor loan payments and the interest that has accrued on the loan over its life.

As in FIG. 15, the edit scenario button 1505 is shown in FIG. 18 and which, upon being clicked or selected by the user, takes the user to the edit scenario user interface 1301 in FIG. 13b where the user can edit and save all of the scenario values, including those that are not included on the variable user interface control 1400.

Figure 19:
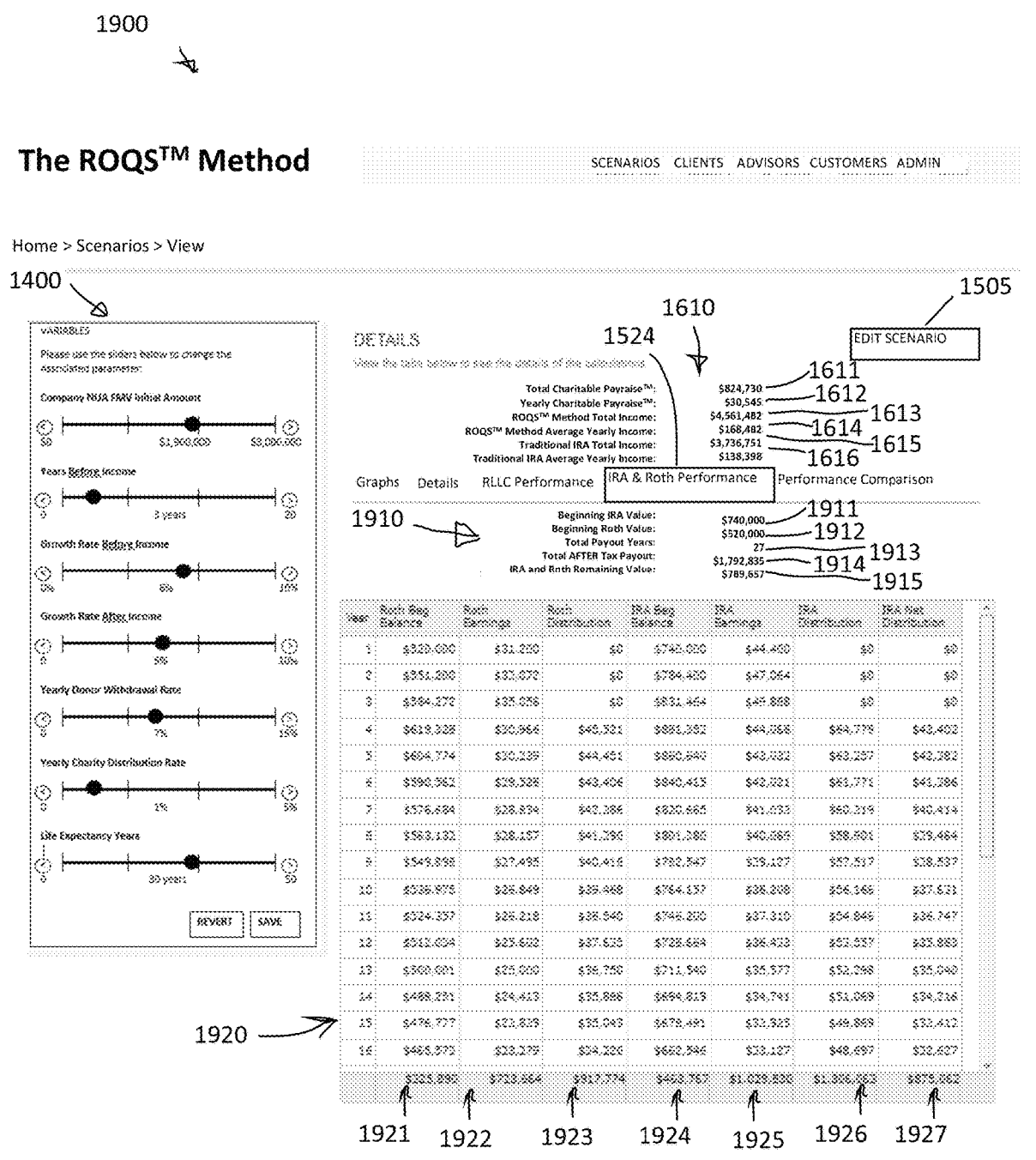

FIG. 19 is a view scenario IRA & Roth performance user interface 1900 for accessing, editing, and varying existing scenario information, in accordance with various embodiments of the disclosed subject matter. In FIG. 19, the view scenario IRA & Roth performance user interface option 1524 is highlighted to show it has been selected and the IRA & Roth performance information for the scenario is displayed below. The variable user interface control 1400 is operable to change the input variables for the scenario, which dynamically updates the numbers in the summary performance IRA & Roth performance section 1610 as well as the detailed data fields shown in an IRA & Roth performance section 1910 of the view scenario IRA & Roth performance user interface 1900. In FIG. 19, the IRA & Roth performance section 1910 includes a beginning IRA dollar value 1911 from the shown embodiment of the disclosed subject matter; a beginning Roth dollar value 1912 for the shown embodiment of the disclosed subject matter; a number of years over which loans and distributions are made to the donor 1913 for the shown embodiment of the disclosed subject matter; a total after tax payout from the IRA and Roth IRA 1914 for the shown embodiment of the disclosed subject matter; and an IRA and Roth IRA remaining value 1915. The IRA & Roth performance section 1910 also includes a table 1920 with columns that list: a total beginning capital value of the Roth IRA 1921; a yearly interest earnings 1922 on the capital in the Roth IRA; a yearly donor Roth IRA distribution 1923; a total beginning capital value of the IRA 1924; a yearly interest earnings 1925 on the capital in the IRA; a yearly donor IRA distribution 1926; and a cumulative ending loan balance 1927, which includes all loans made to the donor and the accrued interest over the life of the RLLC.

As in FIG. 15, the edit scenario button 1505 is shown in FIG. 19 and which, upon being clicked or selected by the user, takes the user to the edit scenario user interface 1301 where the user can edit and save all of the scenario values, including those that are not included on the variable user interface control 1400.

Figure 20:
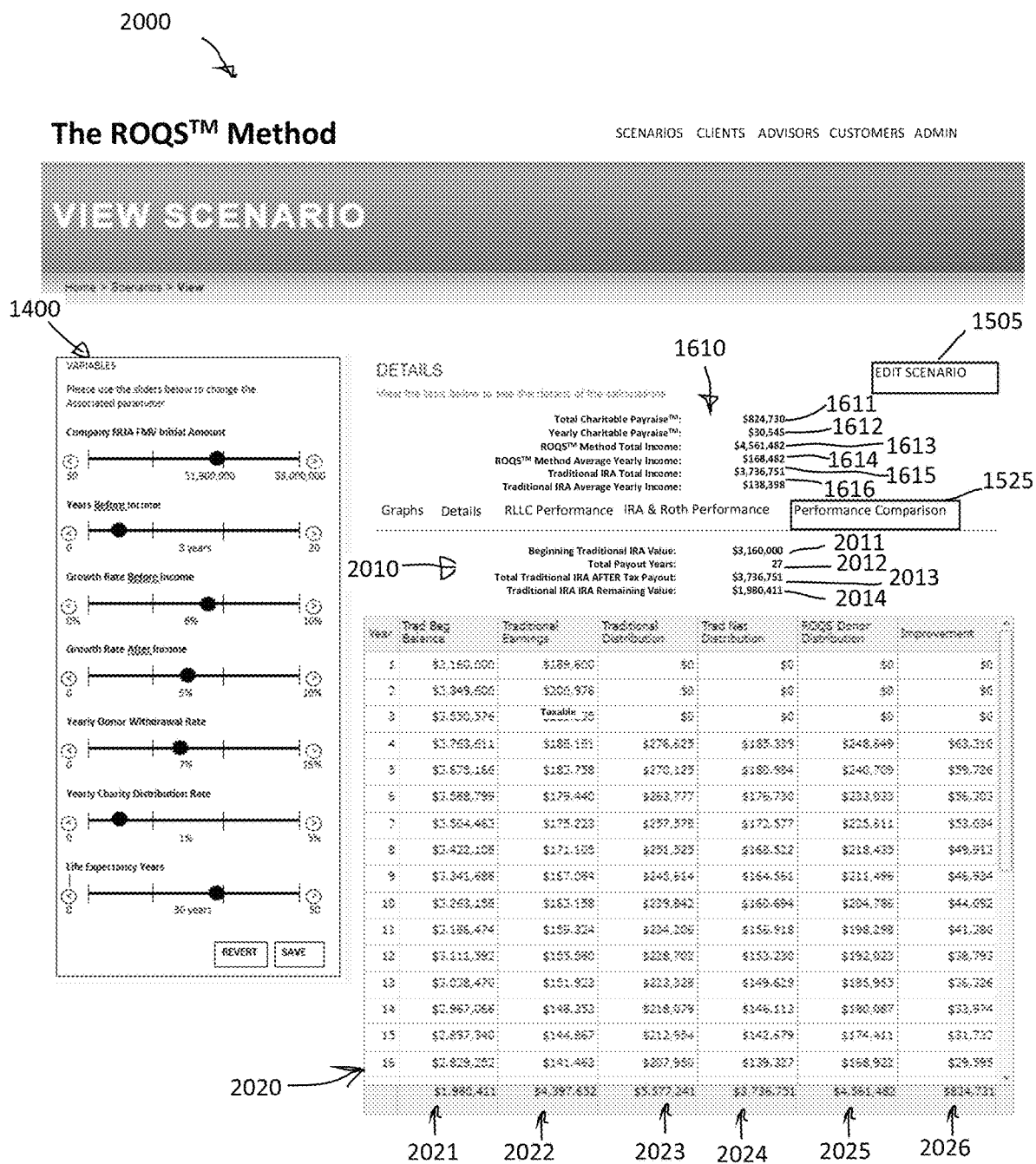
FIG. 20 is a view scenario performance comparison user interface for accessing, editing, and varying existing scenario information, in accordance with various embodiments of the disclosed subject matter.

FIG. 20 is a view scenario performance comparison user interface 2000 for accessing, editing, and varying existing scenario information, in accordance with various embodiments of the disclosed subject matter. In FIG. 19, the view scenario performance comparison user interface option 1525 is highlighted to show it has been selected and the performance comparison information for the scenario is displayed below. The variable user interface control 1400 is operable to change the input variables for the scenario, which dynamically updates the numbers in the summary performance comparison section 1610 as well as the detailed data fields shown in a performance comparison section 2010 of the view scenario performance comparison user interface 2000. In FIG. 20, the performance comparison section 2010 includes a beginning Traditional IRA dollar value 2011 from the shown embodiment of the disclosed subject matter; a number of years over which loans and distributions are made to the donor 2012 for the shown embodiment of the disclosed subject matter; a total after tax payout from the Traditional IRA 2013 for the shown embodiment of the disclosed subject matter; and a Traditional IRA remaining value 2014. The performance comparison section 2010 also includes a table 2020 with columns that list: a beginning capital value of the Traditional IRA 2021; a yearly interest earnings 2022 on the capital in the Traditional IRA; a yearly donor Traditional IRA distribution 2023 gross amount; a yearly donor Traditional IRA distribution 2024 net amount, i.e., after taxes; a yearly distribution to the donor 2025 from the shown embodiment of the disclosed subject matter; and a net improvement over the Traditional IRA 2026 by the shown embodiment of the disclosed subject matter, which includes all loan, Roth IRA and IRA payments made to the donor. In similar fashion, like calculations are expressed and illustrated whereby identical charitable, deductible donations are made from the Traditional Rollover IRA when the user "toggles" to this scenario.

FIG. 21 is a user interface 2100 showing an illustrative example output for a single scenario with arrows showing the flow of an example individual's retirement fund allocation, in accordance with other various embodiments of the disclosed subject matter. In FIG. 21, the user interface 2100 displays a calculated scenario based on an individual's retirement information inputs. The user interface 2100 includes a total 401K field 2110 with a value of $2,000,000, a Rollover IRA field 2111 with a value of $1,600,000, a NUA Account field 2112 with a value of $400,000, a NUA Stock Basis field 2113 with a value of $200,000, a NUA Stock Discount Percent (%) field 2114 with a value of 20%, a Donor Ownership Shares % field 2115 with a value of 1%, and a Donee Ownership Shares % field 2116 with a value of 99%. A Stock Excess field 2117 with a value of $0 and a Basis for Stock Excess field 2118 with a value of $0. These are generally $0 in an initial scenario based on an original set of inputs but are recalculated when a user performs what-if calculations by varying the inputs based on values entered in a What Ifs section 2150, which is described herein below. A Charitable Deduction field 2119 with a value of $316,000 is calculated by reducing the value of the percentage of the NUA Shares donated to the charity, which in this example is 99% (i.e., the Donee Ownership Shares % field 2116) by the value NUA Stock Discount Percent (%) field 2114 (e.g., 20% of 99% of $400,000=$316,800). From the calculated Charitable Deduction field 2119 (e.g., $316,800) the value in the NUA Stock Basis field 2113 (e.g., $200,000) is subtracted to determine a value for the Charitable Deduction Remaining field 2120 (e.g., $116,800). If there is a positive value in the Charitable Deduction Remaining field 2120, then up to 100% of the value in the Charitable Deduction Remaining field 2120 can be used to fund a Roth IRA, provided the value in the Rollover IRA field 2111 is greater than the Charitable Deduction Remaining field 2120. As seen in the example in FIG. 21, the Charitable Deduction Remaining field 2120 value is $116,800 and the Rollover IRA field 2111 value is $1,600,000, so the entire $116,800 can be taken from the Rollover IRA field 2111 value to fund the Roth IRA and, thus, $116,800 appears in a Roth IRA field 2121. An IRA field 2122 (e.g., $1,483,200) shows a remaining value from the Rollover IRA field 2111 after subtracting the Charitable Deduction Remaining field 2120 that was used to fund the Roth IRA field 2121.

In FIG. 21, a RLLC field 2123 is initially calculated to be equal to the NUA Account field 2112 (e.g., $400,000), but can vary based on a user performing "what-if" calculations and varying the NUA Account Initial $ in the What-Ifs section 2150, which will be discussed in greater detail herein below. A No Tax Sale field 2124 reflects the calculated cash value after the sale of the NUA stock (e.g., $400,000), which, in general, is equal to the value in the RLLC field 2123 (e.g., $400,000), which could be bigger or smaller based on broker fees and market value fluctuation, but in this example is assumed to be the same. A Before Yearly RLLC Loans are Taken field 2125 ($476,406) is calculated using the value in the No Tax Sale field 2124, the number of years before the individual plans to take retirement income, i.e., income from IRAs and loans from the RLLC, and the percentage value of the growth rate of the RLLC before loans are taken. A Donor Average Yearly RLLC Loan field 2126 (e.g., $14,482) and an Average Yearly Charity Distribution field 2127 (e.g., $2,158) are calculated averages over the planned life of the RLLC. The Donor Average Yearly RLLC Loan field 2126 is calculated using the Before Yearly RLLC Loans are Taken field 2125 value (e.g., $476,406), the input growth rate % of the RLLC after loans to the Donor begin (e.g., 5%), the input number of years the individual expects to live (e.g., 30), i.e., the length of the RLLC, and the input % value of the growth rate of the RLLC after loans start being taken. The Average Yearly Charity RLLC Distribution field 2127 (e.g., $2,158) is calculated using the Before Yearly RLLC Loans are Taken field 2125 value, the input growth rate % of the RLLC after the Charity distributions begin (e.g., 5%), the input number of years the individual expects to live, i.e., the length of the RLLC (e.g., 30), and the input % value of the growth rate of the RLLC after loans start being taken (e.g., 5%). The user interface 2100 further includes an After Tax Donor Average Yearly RLLC Loan field 2128 (e.g., $14,482) and an After Tax Average Yearly Charity RLLC Distribution field 2129 (e.g., $2,158), which are calculated as after tax averages over the planned life of the RLLC. As seen in the user interface 2100, the After Tax Donor Average Yearly RLLC Loan field 2128 is the same value as the Donor Average Yearly RLLC Loan field 2126 value, because the "income" is taken out in the form of loans, no tax is owed. Similarly, the After Tax Average Yearly Charity RLLC Distribution field 2129, if there is no value over 0% in an Unrelated Business Taxable Income (UBTI) Tax Rate field 2130, is the same value as the Average Yearly Charity RLLC Distribution field 2127. However, if the UBTI Tax Rate field 2130 has a tax rate value greater than 0%, then the value of the Average Yearly Charity RLLC Distribution field 2127 is reduced by the tax rate % value UBTI Tax Rate field 2130 and the remainder is the value of the After Tax Average Yearly Charity RLLC Distribution field 2129.

In FIG. 21, the user interface 2100 further includes a Total RLLC Income field 2132 and a Total Charity RLLC Distribution field 2133, where the Total RLLC Income field 2132 is calculated using the After Tax Donor Average Yearly RLLC Loan field 2128 by the number of years that the individual expects to obtain loans from the RLLC. Similarly, the Total Charity RLLC Distribution field 2133 can be calculated using the After Tax Average Yearly Charity RLLC Distribution field 2129 and the number of years that the charity expects to obtain income/loans for the RLLC. In general, the charity will receive distributions starting in year one, so the Total Charity RLLC Distribution field 2133 is generally the same as the expected life of the RLLC. However, if the charity decides to delay starting the distributions, then the Total RLLC Charity Distribution field 2133 is calculated using the Average After Tax Yearly RLLC Charity Distribution field 2129 and the actual number of years that the charity expects to receive distributions from the RLLC.

In FIG. 21, the user interface 2100 still further includes a Before Yearly IRA Income is Taken field 2134 and a Before Yearly Roth IRA Income is Taken field 2135. The value of the Before Yearly IRA Income is Taken field 2134 is calculated to be $0, if the Rollover IRA Field 2111 plus any other of the individual's Pre-Tax retirement account assets is less than the Charitable Deduction Remaining field 2120. However, if the Rollover IRA Field 2111 plus any other of the individual's Pre-Tax retirement account assets is greater than the Charitable Deduction Remaining field 2120, then the value for the Before Yearly IRA Income is Taken field 2134 is calculated using the Rollover IRA Field 2111, any other of the individual's Pre-Tax retirement account assets, the Charitable Deduction Remaining field 2120, and the Stock Excess field 2117. As noted above, and as will be described below in greater detail, in general, the Stock Excess field 2117 is $0, unless, during a What-if calculation the amount of the NUA account is reduced to less than the total value in the NUA account. The value of the Before Yearly Roth IRA Income is Taken field 2135 is calculated using the input Growth % before income, the Rollover Roth IRA Field 2121 value, and the number of Years Before income. An Average Yearly IRA Income Field 2136 is calculated as the average yearly income over the number of years that income is received from the IRA (e.g., $99,693). Similarly, an Average Yearly Roth IRA Income Field 2137 is the average yearly income over the number of years that income is received from the IRA (e.g., $7,271). An Average After Tax Yearly IRA Income Field 2138 is the average after yearly income taxes are withdrawn over the number of years that income is received from the IRA (e.g., 66,795). Similarly, an Average After Tax Yearly Roth IRA Income Field 2139 is the same value (e.g., $7,271) as the Average Yearly Roth IRA Income Field 2137, because funds withdrawn from a Roth IRA are not taxable.

In FIG. 21, the user interface 2100 includes a Total After Tax IRA Income field 2140 is calculated using the total after tax income received from the IRA account, and the years that the individual withdraws money from the IRA (e.g., $1,803,455). A Total After Tax Roth IRA Income field 2141 shows the total income received from the IRA account over the years that the individual withdraws money from the Roth IRA (e.g., $196,330), but, as noted above, unlike the Total After Tax IRA Income field 2140, no income tax is deducted from the Total After Tax Roth IRA Income field 2141, because Roth IRA withdrawals are not taxable. The user interface 2100 also includes a Total After Tax IRA plus Roth IRA Income field 2142 (e.g., $1,999,785), which is the total of the Total After Tax IRA Income field 2140 and the Total After Tax Roth IRA Income field 2141. A total IRA, Roth IRA, and RLLC Income field 2143 displays the total income received by the Donor at their death and the end of the RLLC (e.g., $2,808,314). The user interface 2100 also includes a The Charitable PayRaise™ vs. IRA Increase/Decrease field 2144, which shows the calculated increase or decrease expected from using the system and method of the presently disclosed subject matter over a Traditional IRA (e.g., $637, 102). This is an increase over the Traditional IRA of over 29% and which is shown in a Total Income Increase/Decrease field 2145. In addition, a Donor Management Fee Taxable Income field 2146 is calculated on a yearly basis based on the percentage entered for the management fee and the yearly capital value of the RLLC after disbursing the loan withdrawal, the charity distribution, and management fee. However, a total value over the life of the RLLC is shown in the Donor Management Fee Taxable Income field 2146 (e.g., $127,983). Because this fee is payment to the Donor for services as the manager of the RLLC, it is taxable at the Donor's ordinary income tax rate. The amount of this payment is also not used to calculate the increase or decrease of the ROQS™ system income over a Traditional IRA for all of the individual's retirement assets.

The user interface 2100 in FIG. 21 also includes a Traditional IRA calculation section 2160 that shows the income generated using only a traditional IRA for comparison with the results of the ROQS system, or traditional IRA less charitable donations. The Traditional IRA calculation section 2160 includes a Traditional IRA field 2161 that shows the entire 401K field 2110 value, here $2,000,000, which was rolled over into the Rollover IRA field 2111 and then rolled into the Traditional IRA field 2161. Like the IRA field 2122, all withdrawals from the Traditional IRA field 2161 are taxed as ordinary income, so there is no tax saving benefit on the company stock value as in the ROQS method. The Traditional IRA calculation section 2160 also includes a Before Yearly Traditional IRA Income is Taken field 2162 (e.g., $2,315,250), which is calculated by compounding the Before Income Growth Percentage (%) on the value in the Traditional IRA field 2161. A Gross Average Yearly Traditional IRA Income field 2163 (e.g., $120,023) shows the before tax average yearly income the individual can expect based on the Before Yearly Traditional IRA Income is Taken field 2162, the After Yearly Income Growth rate, the number of years over which the individual will receive withdrawals from the Traditional IRA, the yearly withdrawal amounts, and all Traditional IRA management fee charges. The user interface 2100 also includes a Net Average After Tax Yearly Traditional IRA Income field 2164, which is the net, i.e., after tax, value of the average yearly income that is received from the Traditional IRA over the retirement lifetime of the individual (e.g., $80,415); and a Net Total After Tax Traditional IRA Income field 2165, which contains the net, after tax income the individual will receive from the Traditional IRA over his/her retirement years (e.g., $2,171,213).

In the user interface 2100 in FIG. 21, the What If section 2150 includes what-if input fields to enable the user to vary the original input values, to perform what-if calculations to determine whether a different distribution of assets would provide a better retirement plan. These what-if input fields include, for example, but are not limited to, a Vary NUA Account Initial Amount field 2151, a Vary Years Before Income field 2152, a Vary Growth Rate Percent (%) Before Income field 2153, a Vary Growth Rate Percent (%) After Income field 2154, a Vary IRA Withdrawal Rate Percent (%) After Income field 2155, a Vary RLLC Withdrawal/Loan Rate Percent (%) After Income field 2156, a Vary Charity Distribution Rate Percent (%) field 2157, and a Vary Life Expectancy field 2158. The system and method can be set to automatically recalculate the individuals retirement plan after each entry or it can wait to recalculate until the user requests that the recalculation be performed. In addition, an original input values summary area 2159 can be provided adjacent the What If section 2150 in the user interface 2100 that can display the originally entered value for each of the fields in the What If section 2150 as a convenient reference for the user. These can include, for example, but are not limited to, an Original NUA Account Initial Amount value 2151*a*, an Original Years Before Income value 2152*a*, an Original Growth Rate Percent (%) Before Income value 2153*a*, an Original Growth Rate Percent (%) After Income value 2154*a*, an Original IRA Withdrawal Rate Percent (%) After Income value 2155*a*, an Original RLLC Withdrawal/Loan Rate Percent (%) After Income value 2156*a*, an Original Charity Distribution Rate Percent (%) value 2157*a*, and an Original Life Expectancy value 2158*a*. Individual what-if scenarios created by the user can be saved as alternatives or, if a particular what-if scenario appears to provide a better retirement plan, then it can be saved as a replacement for the original inputs.

In accordance with various embodiments of the disclosed subject matter, a computerized method includes: receiving via a network from a computer, retirement financial assets and retirement plan information associated with an individual; determining from the retirement financial assets and retirement plan information and whether the individual has any publicly traded company stock in at least one qualified retirement plan; in response to the individual having publicly traded company stock in the at least one qualified retirement plan: determining, by a processor, retirement financial assets and retirement plan information and how many years until the individual will start withdrawing retirement income from the at least one qualified retirement plan; in response to the individual not starting to withdraw retirement income for over two years and 1 day: receiving a yearly asset value growth rate before taking retirement income, a yearly asset value growth rate after starting taking retirement income, a yearly retirement income withdrawal rate, a yearly charity distribution withdrawal rate, and a life expectancy for the individual; receiving a specialized limited liability company (LLC) structure information; receiving a yearly charity distribution amount for the RLLC; receiving additional retirement financial and life insurance information; receiving individual and IRA management fee information; calculating, by the processor, a charitable deduction due to the individual for an amount of donated LLC units and allocating any other retirement assets into a Rollover IRA and a Roth IRA to maximize an amount allocated to the Roth IRA; calculating, by the processor, yearly payments to be paid to the individual from the Rollover IRA and the Roth IRA, yearly loans from the LLC, a total amount the individual will owe to the LLC at term, a yearly amount to be paid to charity, and a total LLC account value at term; calculating, by the processor, an improvement in retirement income over a traditional Rollover IRA; and displaying, on at least one user interface, a calculated yearly and a total income for the individual from the Rollover IRA and the Roth IRA, and the yearly loans from the LLC, the yearly amount to be paid to the charity, a total payments to the charity, a total amount the individual owes on the yearly loans from the LLC, a total LLC account value at term, and the improvement in retirement income over a traditional Rollover IRA.

In accordance with various embodiments of the disclosed subject matter, one or more non-transitory computer-readable media for the allocation of retirement account corporate stock rollover assets using charitable entities to maximize retirement income, including computer instructions for performing a method including: receiving via a network from a computer, retirement financial assets and retirement plan information associated with an individual; determining from the inputs of retirement financial assets and goal information whether the individual 1 has any publicly traded company stock in at least one qualified retirement plan; in response to the individual having publicly traded company stock in the at least one qualified retirement plan: determining, by a processor, retirement financial assets and retirement plan information and how many years until the individual will start withdrawing retirement income from the at least one qualified retirement plan; in response to the individual not starting to withdraw retirement income for over two years and 1 day: receiving a yearly asset value growth rate before taking retirement income, a yearly asset value growth rate after starting taking retirement income, a yearly retirement income withdrawal rate, a yearly charity distribution withdrawal rate, and a life expectancy for the individual; receiving a specialized limited liability company (LLC) structure information; receiving a yearly charity distribution amount for the RLLC; receiving additional retirement financial and life insurance information; receiving individual and IRA management fee information; calculating, by the processor, a charitable deduction due to the individual for an amount of donated LLC units and allocating any other retirement assets into a Rollover IRA and a Roth IRA to maximize an amount allocated to the Roth IRA; calculating, by the processor, yearly payments to be paid to the individual from the Rollover IRA and the Roth IRA, yearly loans from the LLC, a total amount the individual will owe to the LLC at term, a yearly amount to be paid to charity, and a total LLC account value at term; calculating, by the processor, an improvement in retirement income over a traditional Rollover IRA; and displaying, on at least one user interface, a calculated yearly and a total income for the individual from the Rollover IRA and the Roth IRA, and the yearly loans from the LLC, the yearly amount to be paid to the charity, a total payments to the charity, a total amount the individual owes on the yearly loans, a total LLC account value at term, and the improvement in retirement income over a traditional Rollover IRA.

In accordance with various embodiments of the disclosed subject matter, a retirement planning platform for maximizing retirement income using charitable entity giving, including: at least one processor; at least one computer-readable storage medium communicatively connected to the at least one processor and having instructions stored thereon which, when executed by the at least one processor, cause the retirement planning platform to: receive via a network from a computer, retirement financial assets and goal information associated with an individual; determine from the inputs of retirement financial assets and goal information whether the individual has any publicly traded company stock in at least one qualified retirement plan; in response to the individual having publicly traded company stock in the at least one qualified retirement plan: determine, by a processor, retirement financial assets and goal information and how many years until the individual will start withdrawing retirement income from the at least one qualified retirement plan; in response to the individual not starting to withdraw retirement income for over two years and 1 day: receive a yearly asset value growth rate before taking retirement income, a yearly asset value growth rate after starting taking retirement income, a yearly retirement income withdrawal rate, a yearly charity distribution withdrawal rate, and a life expectancy for the individual; receive a specialized limited liability company (LLC) structure information; receive a yearly charity distribution amount from the LLC; receive additional retirement financial and life insurance information; receive individual and IRA management fee information; calculate, by the processor, a charitable deduction due to the individual for an amount of donated LLC units and allocating any other retirement assets into a Rollover IRA and a Roth IRA to maximize an amount allocated to the Roth IRA; calculate, by the processor, yearly payments to be paid to the individual from the Rollover IRA and the Roth IRA, yearly loans from the LLC, a total amount the individual will owe to the LLC at term, a yearly amount to be paid to charity, and a total value of the LLC at term; calculate, by the processor, an improvement in retirement income over a traditional Rollover IRA; and display, on at least one user interface, a calculated yearly and a total income for payments to the individual from the Rollover IRA and the Roth IRA, the yearly loans from the LLC, the yearly amount to be paid to the charity, a total payments to the charity, a total amount the individual owes on the yearly loans, a total LLC account value at term, and the improvement in retirement income over a traditional Rollover IRA.

While the disclosed subject matter has been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the disclosed subject matter described herein. Therefore, the above-described embodiments should not be taken as limiting.

What is claimed is:

1. A computerized method for use in a retirement planning and charitable giving system, the computerized method comprising:
    receiving via a network from a computer, inputs of retirement financial assets and retirement plan information associated with an individual;
    determining from the retirement financial assets and retirement plan information and whether the individual has any publicly traded company stock in at least one qualified retirement plan;
    in response to the individual having any publicly traded company stock in the at least one qualified retirement plan:
    determining, by a processor, the retirement financial assets and retirement plan information and how many years until the individual will start withdrawing retirement income from the at least one qualified retirement plan;
    in response to the individual not starting to withdraw retirement income for over two years and one day:
    receiving a yearly asset value growth rate before taking retirement income, a yearly asset value growth rate after starting taking retirement income, a yearly retirement income withdrawal rate, a yearly charity distribution withdrawal rate, and a life expectancy for the individual;
    receiving a specialized limited liability company (LLC) structure information;
    receiving a yearly charity distribution amount from the LLC;
    receiving additional retirement financial and life insurance information;
    receiving individual and IRA management fee information;
    calculating, by the processor, a charitable deduction due to the individual for an amount of donated LLC units and allocating any other retirement assets into a Rollover IRA and a Roth IRA to maximize an amount allocated to the Roth IRA;
    calculating, by the processor, yearly payments to be paid to the individual from the Rollover IRA and the Roth IRA, yearly loans from the LLC, a total amount the individual will owe to the LLC at term, a yearly amount to be paid to the charity, and a total LLC account value at term;
    calculating, by the processor, an improvement in retirement income over a Traditional Rollover IRA; and
    displaying, in a first section of a user interface, a performance summary total comparison of the Traditional Rollover IRA versus the retirement planning and charitable giving system based on the inputs of the retirement financial assets and retirement plan information;
    displaying, in a second section of the user interface, one or more displays of information based on the inputs of the retirement financial assets and retirement plan information;
    displaying, in a third section of the user interface, a user-adjustable set of controls configured to dynamically adjust a plurality of the inputs of the retirement financial assets and retirement plan information, which when at least one of the user- adjustable set of controls is adjusted, the computerized method dynamically displays a revised performance summary total comparison of the Traditional Rollover IRA versus the retirement planning in the first section of the user interface and one or more revised displays of information in the second section of the user interface.

2. The computerized method of claim 1 further comprising:
    saving the inputs and calculations to a memory from the processor.

3. The computerized method of Claim 1 further comprising:
    varying at least one of the inputs;
    recalculating, by the processor, the charitable deduction due to the individual for the amount of donated LLC units and allocating any other retirement assets into the Rollover IRA and the Roth IRA to maximize the amount allocated to the Roth IRA;
    recalculating, by the processor, yearly payments to be paid to the individual from the Rollover IRA, the Roth IRA, and the LLC, the total amount the individual will owe to the LLC at term, the yearly amount to be paid to charity, and a total value of the LLC at term;
    recalculating, by the processor, -the improvement in retirement income over the Traditional Rollover IRA; and
    redisplaying, in the second section of the user interface, the recalculated yearly and total income for the individual from the Rollover IRA, the Roth IRA, and the LLC, the yearly amount to be paid to the charity, the total payments to the charity, what the individual owes on the yearly loans from the LLC, the total LLC account value at term, and the improvement in retirement income over the Traditional Rollover IRA.

4. The computerized method of claim 1 further comprising:
saving the inputs and calculations to a memory from the processor.

5. The computerized method of claim 1 further comprising:
calculating an optimal allocation scenario for the retirement financial assets to maximize yearly income for the individual.

6. The computerized method of claim 5 wherein the calculating an optimal allocation of the retirement financial assets to maximize yearly income for the individual comprises:
calculating at least one optimal allocation scenario for the retirement financial assets to maximize yearly income for the individual using one or more Monte Carlo simulations.

7. The computerized method of claim 6 further comprising:
displaying the calculated at least one optimal allocation scenario with a current allocation scenario with comparison information to show differences between the at least one optimal allocation scenario and the current allocation scenario.

8. The computerized method of claim 1 where the third section of the user interface further comprises a save button configured, when selected, to save a new scenario based on a currently displayed plurality of inputs of retirement financial assets and retirement plan information in the third section of the user interface.

9. The computerized method of claim 1 where the third section of the user interface further comprises a revert button configured, when selected, to display an immediately prior scenario based on an immediately prior displayed plurality of inputs of retirement financial assets and retirement plan information in the third section of the user interface.

10. The computerized method of claim 1 where the displaying in the second section of the user interface one or more displays of information based on inputs of retirement financial assets and retirement plan information comprises displaying in the second section of the user interface at least one of:
one or more graphical displays of performance information based on the inputs of the retirement financial assets and retirement plan information;
the inputs of the retirement financial assets and retirement plan information;
at least one display of performance information for the retirement planning and charitable giving system based on the inputs of the retirement financial assets and retirement plan information;
at least one display of performance information for the retirement planning and charitable giving system based on the inputs of the retirement financial assets and retirement plan information;
at least one display of performance information for the Traditional IRA and a Roth IRA performance based on the inputs of the retirement financial assets and retirement plan information; and
at least one display of a performance comparison of the retirement planning and charitable giving system and the Traditional IRA and the Roth IRA performance based on the inputs of the retirement financial assets and retirement plan information.

11. The computerized method of claim 1 where the computerized method further comprises:
displaying a data entry user interface with a plurality of data entry fields including:
a client field configured to receive a name of the individual;
an advisor field configured to receive a name of a financial advisor of the individual;
a customer field configured to receive a name of a company associated with the financial advisor and the individual;
a retirement state field configured to receive a state in which the individual will retire;
a pre-distribution tax rate field configured to receive a combined state and federal tax rate for the individual;
a post-distribution tax rate field configured to receive a combined state and federal tax rate for the individual;
a current 401K value field configured to receive a 401K total value for the individual;
a company net unrealized appreciation (NUA) stock basis field configured to receive a basis value of a NUA stock;
a company NUA stock value field configured to receive a NUA stock total value of the NUA stock;
an other pre-tax retirement assets field configured to receive a 401K value for the individual;
a company stock field configured to receive a symbol for the NUA stock;
a company stock value discount field configured to receive a charitable discount value for the NUA stock;
a date to sever the NUA stock and other pre-tax retirement assets field configured to receive a date on which the NUA stock and other pre-tax retirement assets will be transferred;
a number of years until income field configured to receive a number of years before the individual will receive distributions;
a growth rate prior to distribution field configured to receive an account growth rate before the individual will receive loans;
a growth rate after distribution begin field configured to receive an account growth rate before the individual will receive loans;
a yearly withdrawal rate field configured to receive a yearly rate of withdrawal;
a yearly charity distribution rate field configured to receive a yearly rate of a distribution to a charity;
a life expectancy field configured to receive a number of years of life expectancy for the individual;
a state of incorporation field configured to receive a state in which a charitable limited liability company will be incorporated;
a trust name field configured to receive a name of the charitable limited liability company;
a loan interest rate field configured to receive an initial interest rate for loans to the individual;
a life insurance policy value field configured to receive a value of life insurance for the individual;
a notes field configured to receive at least one text entry; and
an active box configured to receive a text entry to indicate whether the individual is active.

12. One or more non-transitory computer-readable media for allocation of retirement account corporate stock rollover assets using charitable entities to maximize retirement income, including computer instructions for performing a method comprising:
receiving via a network from a computer, inputs of retirement financial assets and retirement plan information associated with an individual;
determining the retirement financial assets and retirement plan information and whether the individual has any publicly traded company stock in at least one qualified retirement plan;
in response to the individual having any publicly traded company stock in the at least one qualified retirement plan:
determining, by a processor, the retirement financial assets and retirement plan information and how many years until the individual will start withdrawing retirement income from the at least one qualified retirement plan;
in response to the individual not starting to withdraw retirement income for over two years and one day:
receiving a yearly asset value growth rate before taking retirement income, a yearly asset value growth rate after starting taking retirement income, a yearly retirement income withdrawal rate, a yearly charity distribution withdrawal rate, and a life expectancy for the individual;
receiving a specialized limited liability company (LLC) structure information;
receiving a yearly charity distribution amount from the LLC;
receiving additional retirement financial and life insurance information;
receiving individual and IRA management fee information;
calculating, by the processor, a charitable deduction due to the individual for an amount of donated LLC units and allocating any other retirement assets into a Rollover IRA and a Roth IRA to maximize an amount allocated to the Roth IRA;
calculating, by the processor, yearly payments to be paid to the individual from the Rollover IRA and the Roth IRA, yearly loans from the LLC, a total amount the individual will owe to the LLC at term, a yearly amount to be paid to charity, and a total LLC account value at term;
calculating, by the processor, an improvement in retirement income over a Traditional Rollover IRA; and
displaying, in a first section of a user interface, a performance summary total comparison of the Traditional Rollover IRA versus the retirement planning and charitable giving system;
displaying, in a second section of the user interface, based on a user selection, one or more displays of information determined from the inputs of the retirement financial assets and retirement plan information;
displaying, in a third section of the user interface, a user-adjustable set of controls configured to dynamically adjust a plurality of the inputs of the retirement financial assets and retirement plan information, which when adjusted, dynamically displays a revised performance summary total comparison of the Traditional Rollover IRA versus the retirement planning in the first section of the user interface and one or more revised displays of information in the second section of the user interface.

13. The method of claim 12 further comprising:
saving the inputs and calculations to a memory from the processor.

14. The method of claim 12 further comprising:
varying at least one of the inputs;
recalculating, by the processor, the charitable deduction due to the individual for the donated LLC units and allocating any other retirement assets into the Rollover IRA and the Roth IRA to maximize the amount allocated to the Roth IRA;
recalculating, by the processor, -yearly payments to be paid to the individual from the Rollover IRA, the Roth IRA, and the LLC, the total amount the individual will owe to the LLC at term, the yearly amount to be paid to charity, and a total value of the LLC at term;
recalculating, by the processor, -the improvement in retirement income over the Traditional Rollover IRA; and
redisplaying, in the second section of the user interface, the recalculated yearly and total income for the individual from the Rollover IRA, the Roth IRA, and the LLC, the yearly amount to be paid to the charity, a total payments to the charity, what the individual owes on the yearly loans from the LLC, the total LLC account value at term, and the improvement in retirement income over the Traditional Rollover IRA.

15. The method of claim 12 further comprising:
saving the inputs and calculations to a memory from the processor.

16. The method of claim 12 further comprising:
calculating an optimal allocation scenario for the retirement financial assets to maximize yearly income for the individual.

17. The method of claim 16 wherein the calculating an optimal allocation of the retirement financial assets to maximize yearly income for the individual comprises:
calculating at least one optimal allocation scenario for the retirement financial assets to maximize yearly income for the individual using one or more Monte Carlo simulations.

18. The method of claim 17 further comprising:
displaying the calculated at least one optimal allocation scenario with a current allocation scenario with comparison information to show differences between the at least one optimal allocation scenario and the current allocation scenario.

19. A retirement planning platform to maximize retirement income using charitable entity giving, comprising:
a computer system including at least one processor;
at least one computer-readable storage medium communicatively connected to the computer and the at least one processor and having instructions stored thereon which, when executed by the at least one processor, cause the retirement planning platform to:
receive via a network from a computer, inputs of retirement financial assets and retirement plan information associated with an individual;
determine from the inputs of the retirement financial assets and retirement plan information whether the individual has any publicly traded company stock in at least one qualified retirement plan;
in response to the individual having publicly traded company stock in the at least one qualified retirement plan:
determine, by a processor, the retirement financial assets and retirement plan information and how many years until the individual will start withdrawing retirement income from the at least one qualified retirement plan;
in response to the individual not starting to withdraw retirement income for over two years and one day:
receive a yearly asset value growth rate before taking retirement income, a yearly asset value growth rate after starting taking retirement income, a yearly retirement income withdrawal rate, a yearly charity distribution withdrawal rate, and a life expectancy for the individual;
receive a specialized limited liability company (LLC) structure information;
receive a yearly charity distribution amount from the LLC;
receive additional retirement financial and life insurance information;
receive individual and IRA management fee information;
calculate, by the processor, a charitable deduction due to the individual for an amount of donated LLC units and allocating any other retirement assets into a Rollover IRA and a Roth IRA to maximize an amount allocated to the Roth IRA;
calculate, by the processor, yearly payments to be paid to the individual from the Rollover IRA and the Roth IRA, yearly loans from the LLC, a total amount the individual will owe to the LLC at term, a yearly amount to be paid to charity, and a total LLC account value at term;
calculate, by the processor, an improvement in retirement income over a Traditional Rollover IRA; and
display, in a first section of a user interface, a performance summary total comparison of the Traditional Rollover IRA versus the retirement planning and charitable giving system;
display, in a second section of the user interface, based on a user selection, one or more displays of information determined from the inputs of the retirement financial assets and retirement plan information; and
display, in a third section of the user interface, a user-adjustable set of controls configured to dynamically adjust a plurality of the inputs of the retirement financial assets and retirement plan information, which when adjusted, cause the processor to dynamically display a revised performance summary total comparison of the Traditional Rollover IRA versus the retirement planning in the first section of the user interface and one or more revised displays of information in the second section of the user interface.

20. The retirement planning platform of claim 19 further comprising the at least one computer-readable storage medium communicatively connected to the at least one processor and having instructions stored thereon which, when executed by the at least one processor, cause the retirement planning platform to:
save the inputs, calculations, and the retirement plan estimate comparison to a memory connected to the at least one processor.

21. The retirement planning platform of claim 19 further comprising the at least one computer-readable storage medium communicatively connected to the at least one processor and having instructions stored thereon which, when executed by the at least one processor, cause the retirement planning platform to:
vary at least one of the inputs;
recalculate, by the processor, the charitable deduction due to the individual for the donated LLC units and allocating any other retirement assets into the Rollover IRA and the Roth IRA to maximize the amount allocated to the Roth IRA;
recalculate, by the processor, the yearly payments to be paid to the individual from the Rollover IRA and the Roth IRA, and the yearly loans from the LLC, the total amount the individual will owe to the LLC at term, the yearly amount to be paid to charity, and the total LLC account value at term;
recalculate, by the processor, the improvement in retirement income over the Traditional Rollover IRA; and
redisplay, in the second section of the user interface, the calculated yearly and total income for the individual from the Rollover IRA, the Roth IRA, and the LLC, the yearly amount to be paid to the charity, the total payments to the charity, what the individual owes on the yearly loans from the LLC, the total LLC account value at term, and the improvement in retirement income over the Traditional Rollover IRA.

22. The retirement planning platform of claim 19 further comprising the at least one computer-readable storage medium communicatively connected to the at least one processor and having instructions stored thereon which, when executed by the at least one processor, cause the retirement planning platform to:
save the inputs and calculations to a memory from the processor.

23. The retirement planning platform of claim 19 further comprising the at least one computer-readable storage medium communicatively connected to the at least one processor and having instructions stored thereon which, when executed by the at least one processor, cause the retirement planning platform to:
calculate an optimal allocation scenario for the retirement financial assets to maximize yearly income for the individual.

24. The retirement planning platform of claim 23 wherein the calculate an optimal allocation of the retirement financial assets to maximize yearly income for the individual comprises:
calculate at least one optimal allocation scenario for the retirement financial assets to maximize yearly income for the individual using one or more Monte Carlo simulations.

25. The retirement planning platform of claim 24 further comprising the at least one computer-readable storage medium communicatively connected to the at least one processor and having instructions stored thereon which, when executed by the at least one processor, cause the retirement planning platform to:
display the calculated at least one optimal allocation scenario with a current allocation scenario with comparison information to show differences between the at least one optimal allocation scenario and the current allocation scenario.

* * * * *